(12) United States Patent
Buswell et al.

(10) Patent No.: US 8,079,021 B2
(45) Date of Patent: *Dec. 13, 2011

(54) METHOD AND APPARATUS FOR DISPLAY OF WINDOWING APPLICATION PROGRAMS ON A TERMINAL

(75) Inventors: Randy Buswell, Fremont, CA (US); Bill Gay, Piedmont, CA (US); Sui M. Lam, Fremont, CA (US); David Stone, Fremont, CA (US)

(73) Assignee: WYSE Technology Inc., San Jose, CA (US)

( * ) Notice: Subject to any disclaimer, the term of this patent is extended or adjusted under 35 U.S.C. 154(b) by 1392 days.

This patent is subject to a terminal disclaimer.

(21) Appl. No.: 11/406,359

(22) Filed: Apr. 19, 2006

(65) Prior Publication Data

US 2006/0282253 A1 Dec. 14, 2006

Related U.S. Application Data

(63) Continuation of application No. 09/400,733, filed on Sep. 21, 1999, now Pat. No. 7,720,672, which is a continuation-in-part of application No. 09/342,311, filed on Jun. 29, 1999, now abandoned, which is a continuation of application No. 08/581,168, filed on Dec. 29, 1995, now Pat. No. 5,918,039.

(60) Provisional application No. 60/101,319, filed on Sep. 21, 1998.

(51) Int. Cl.
*G06F 9/45* (2006.01)
(52) U.S. Cl. ........................................ 717/135
(58) Field of Classification Search ............ 717/135
See application file for complete search history.

(56) References Cited

U.S. PATENT DOCUMENTS 4,281,315 A 7/1981 Bauer et al.
(Continued)

FOREIGN PATENT DOCUMENTS

CA 1291270 10/1991
(Continued)

OTHER PUBLICATIONS

French Preliminary Examination Report dated Oct. 14, 2005.
(Continued)

*Primary Examiner* — John Chavis
(74) *Attorney, Agent, or Firm* — McDermott Will & Emery LLP

(57) ABSTRACT

A video display terminal capable of operating with a graphical user interface such as Windows provides windowing functionality to permit use of popular applications programs resident on a server, without requiring more than application data to be transmitted from the server, and keyboard and mouse information to be transmitted from a terminal to the server. A terminal for communicating with a server includes a network interface for communicating with a server and a processor coupled to the network interface for operating with the network interface and for accessing a windows application resident on the server without executing locally the windows application resident on the server. The processor provides windowing functionality to permit use of a windows application resident on the server without requiring more than windowing information of the windows application to be transmitted from the server, wherein the windowing information includes application data. The terminal further includes one or more memories coupled to the processor, wherein the total amount of the one or more memories in the terminal is less than the total amount of one or more memories in the server. The terminal does not include a hard disk, and the terminal is for providing an appearance that is essentially the same as an appearance provided by a personal computer.

28 Claims, 12 Drawing Sheets

U.S. PATENT DOCUMENTS

| | | | |
|---|---|---|---|
| 4,496,943 A | 1/1985 | Greenblatt | |
| 4,509,122 A | 4/1985 | Agnew et al. | |
| 4,905,167 A | 2/1990 | Yamaoka et al. | |
| 4,937,036 A | 6/1990 | Beard et al. | |
| 4,961,133 A | 10/1990 | Talati et al. | |
| 5,063,494 A | 11/1991 | Davidowski et al. | |
| 5,175,813 A | 12/1992 | Golding et al. | |
| 5,179,700 A | 1/1993 | Aihara et al. | |
| 5,241,625 A | 8/1993 | Epard et al. | |
| 5,289,574 A | 2/1994 | Sawyer et al. | |
| 5,321,840 A | 6/1994 | Ahlin et al. | |
| 5,404,445 A | 4/1995 | Matsumoto | |
| 5,408,600 A | 4/1995 | Garfinkel et al. | |
| 5,408,602 A | 4/1995 | Giokas et al. | |
| 5,432,935 A | 7/1995 | Kato et al. | |
| 5,448,045 A | 9/1995 | Clark | |
| 5,461,716 A | 10/1995 | Eagen et al. | |
| 5,477,242 A | 12/1995 | Thompson et al. | |
| 5,495,611 A | 2/1996 | Bealkowski et al. | |
| 5,502,808 A | 3/1996 | Goddard et al. | |
| 5,526,503 A | 6/1996 | Kim | |
| 5,600,844 A | 2/1997 | Shaw et al. | |
| 5,604,887 A | 2/1997 | Naidu et al. | |
| 5,623,663 A | 4/1997 | Morgan et al. | |
| 5,673,403 A | 9/1997 | Brown et al. | |
| 5,680,530 A | 10/1997 | Selfridge et al. | |
| 5,745,759 A | 4/1998 | Hayden et al. | |
| 5,745,762 A | 4/1998 | Celi, Jr. et al. | |
| 5,748,866 A | 5/1998 | Edgar | |
| 5,764,984 A | 6/1998 | Loucks | |
| 5,767,849 A | 6/1998 | Borgendale et al. | |
| 5,799,204 A | 8/1998 | Pesto, Jr. | |
| 5,809,559 A | 9/1998 | Kim | |
| 5,815,661 A | 9/1998 | Gosling | |
| 5,831,609 A | 11/1998 | London et al. | |
| 5,835,713 A | 11/1998 | FitzPatrick et al. | |
| 5,878,223 A | 3/1999 | Becker et al. | |
| 5,909,545 A | 6/1999 | Frese, II et al. | |
| 5,918,039 A | 6/1999 | Buswell et al. | |
| 5,920,863 A * | 7/1999 | McKeehan et al. | 707/10 |
| 5,951,648 A | 9/1999 | Kailash | |
| 5,953,350 A | 9/1999 | Higgins | |
| 5,974,547 A * | 10/1999 | Klimenko | 713/2 |
| 6,275,983 B1 | 8/2001 | Orton et al. | |
| 6,295,075 B1 * | 9/2001 | Janay et al. | 715/747 |
| 6,449,649 B1 * | 9/2002 | Janay et al. | 709/227 |

FOREIGN PATENT DOCUMENTS

| | | |
|---|---|---|
| CA | 2152007 A1 | 6/1995 |
| DE | 43 32 063 | 3/1995 |
| DE | 195 22 185 | 2/1996 |
| DE | 69130042 T2 | 4/1999 |
| EP | 0 237 671 | 9/1987 |
| EP | 0469709 A2 | 2/1992 |
| EP | 0475581 A2 | 3/1992 |
| EP | 0479427 A2 | 4/1992 |
| EP | 0524362 A1 | 1/1993 |
| EP | 0525986 A2 | 2/1993 |
| EP | 0 597 395 | 5/1994 |
| EP | 0 654 936 | 5/1995 |
| EP | 0 468 625 B1 | 8/1998 |
| GB | 2202115 A | 9/1988 |
| GB | 2217155 A | 10/1989 |
| GB | 2269032 A | 1/1994 |
| GB | 2290890 A | 1/1996 |
| GB | 2308793 A | 7/1997 |
| JP | 04 196850 | 7/1992 |
| JP | 5-30966 | 4/1993 |
| JP | 6-266666 A | 9/1994 |
| JP | 06 301555 | 10/1994 |
| JP | 06-301555 | 10/1994 |
| WO | WO 84/02025 | 5/1984 |
| WO | WO 95/15524 | 6/1995 |
| WO | WO 96/02034 A1 | 1/1996 |
| WO | WO 97/02573 A1 | 1/1997 |
| WO | WO 98/58478 | 12/1998 |

OTHER PUBLICATIONS

Canadian Office Action dated Apr. 21, 2004.
Japanese Office Action (with translation) dated Jan. 4, 2006.
Daniel P. Julin, et al., "Generalized Emulation Services for Mach 3.0 Overview, Experiences and Current Status". Nov. 6, 1991, Proceedings of the Second USENIX Mach Symposium, Monterey, CA.
U.S. Appl. No. 09/400,733, filed Sep. 21, 1999, Buswell, et al.
U.S. Appl. No. 09/342,311, filed Jun. 29, 1999, Buswell.
Soccaras et al., Anatomy of an X Terminal, IEEE Spectrum Mar. 1991, pp. 52-55.
U.S. Appl. No. 08/261,492, filed Jun. 17, 1994, London et al.
Hattori, "Apple's strategy 'Battle of the advanced technologies in the home ground'," (Dec. 15, 1995) vol. 33, p. 216-221 (partial translation).
Fryer, Microsoft Press Computer Dictionary, 3rd Ed., 1997, Microsoft Press, p. 175, 485.
Office Action dated Jan. 4, 2007, issued in co-pending U.S. Appl. No. 09/400,733.
Scheifler et al., "The X Window System," ACM Transactions on Graphics, vol. 5 No. 2, XP 000565891, Apr. 1986, pp. 79-109.
Hayes Modem Installation Guide, Hayes Microcomputer Products, Inc., 1995, pp. 11, 20, 23.

* cited by examiner

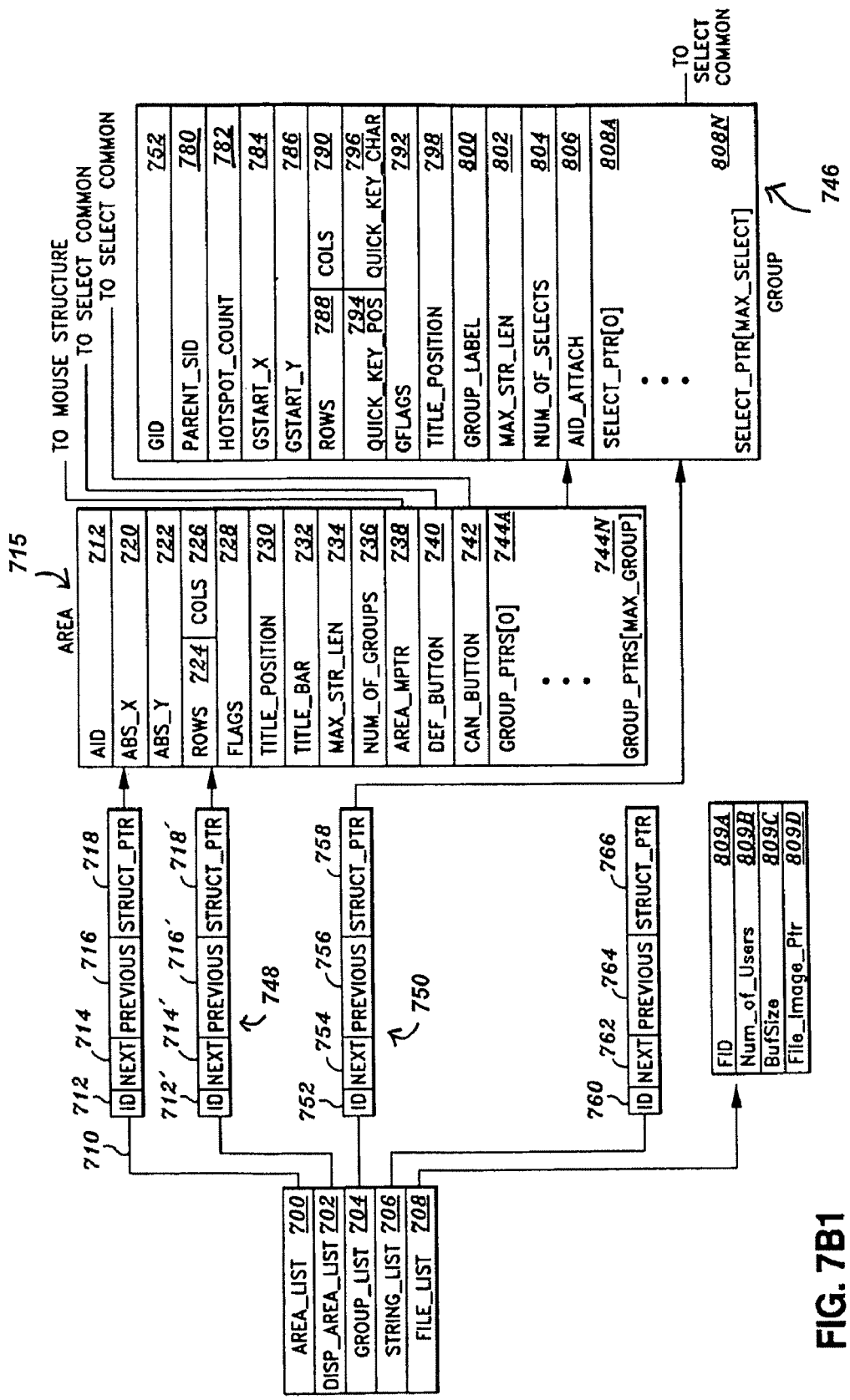
FIG. 7B1

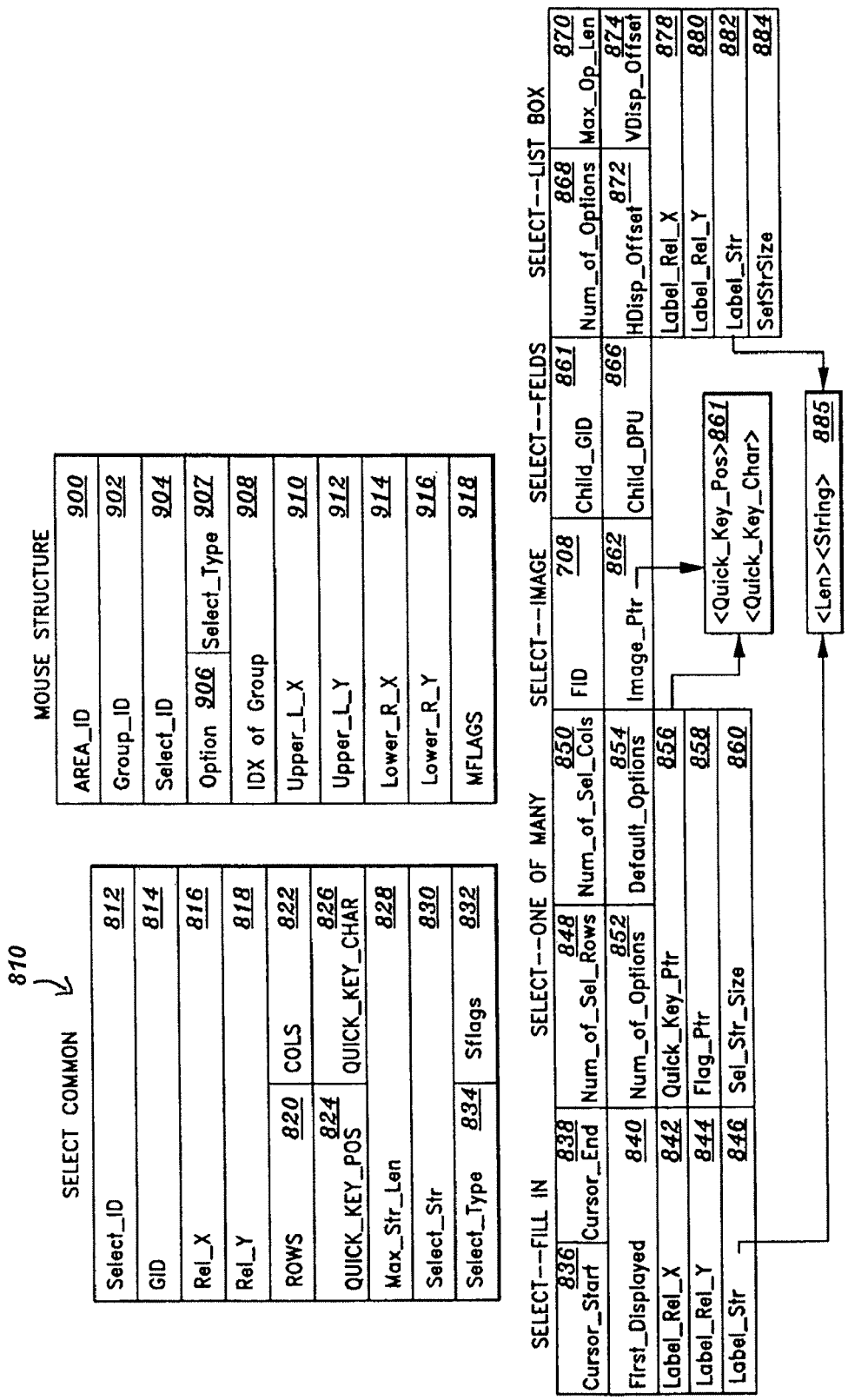
FIG. 7B2

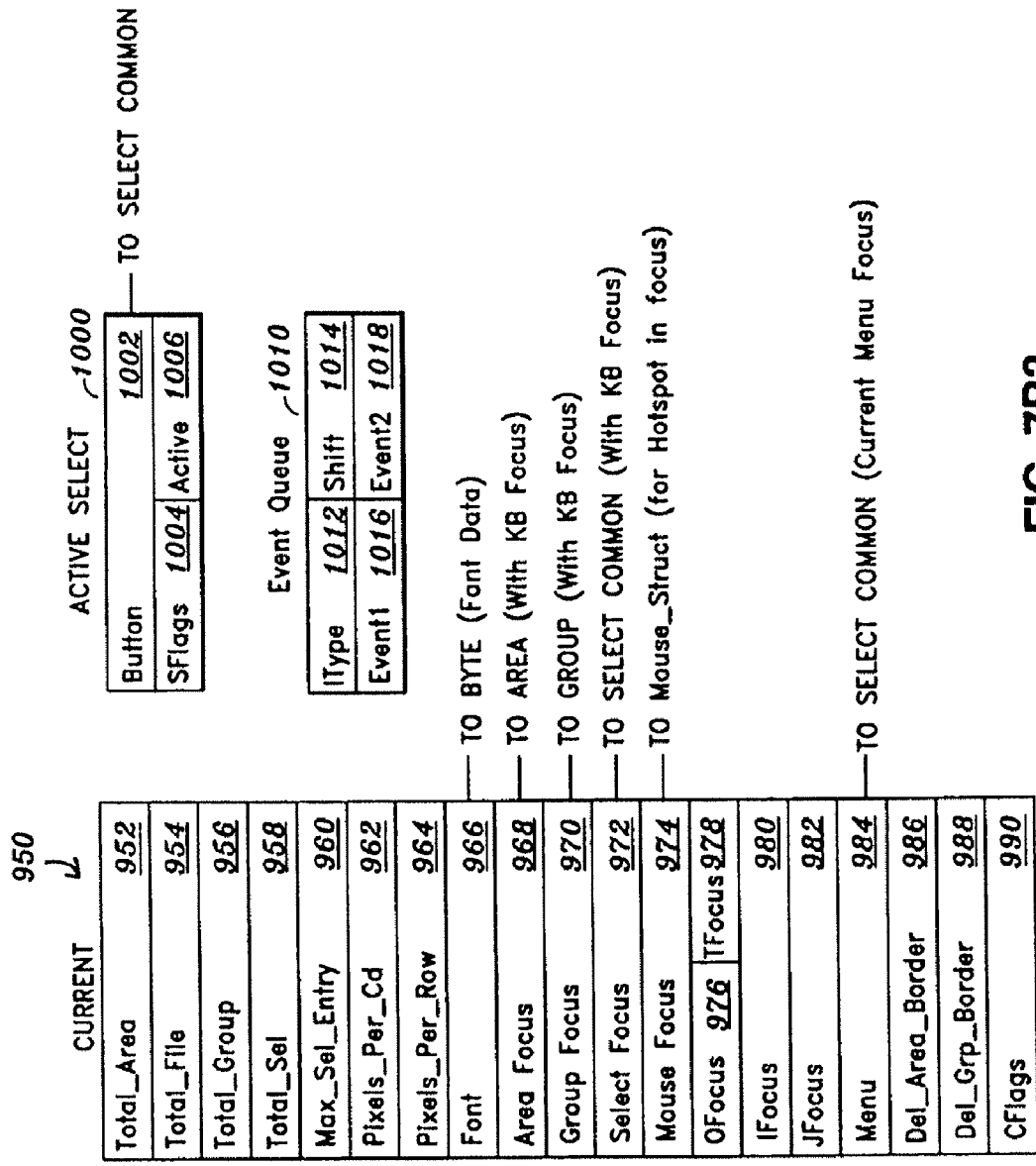
FIG. 7B3

| ADDRESS RANGE | SIZE | BUS WIDTH | DESCRIPTION |
|---|---|---|---|
| 0000,0000-01FF,FFFF | 32MB | 32 (DRAM) | DRAM |
| 0000,0000-0009,FFFF | 640KB | 32 (DRAM) | BASE MEMORY |
| 000A,0000-000B,FFFF | 128KB | 32 (VLB) | VGA DISPLAY MEMORY |
| 000C,0000-000F,FFFF | 256KB | 32 (DRAM) | BOOT BLOCK SHADOW |
| 0200,0000-027F,FFFF | 8MB | 32 (VLB) | VGA LINEAR ADDRESS |
| 0280,0000-02FF,FFFF | 8MB | 32 (VL)/16 (ISA) | PERIPHERALS |
| 0280,0000-0280,FFFF | 64KB | 16 (ISA) | NETWORK MEMORY SPACE |
| 0300,0000-033F,FFFF | 4MB | 8 (FLASH) | ROMCS2(FLASH BANK2) |
| 0340,0000-037F,FFFF | 4MB | 16 (FLASH) | ROM/FLASH BANK 1 |
| 0380,0000-03FF,FFFF | 8MB | 16 (FLASH) | ROM/FLASH BANK 0 |
| 03F0,0000-03FF,FFFF | 1MB | 16 (FLASH) | BOOT ROM/FLASH |

FIG. 8

| ADDRESS RANGE | SIZE | DESCRIPTION |
|---|---|---|
| 0000-000F | 16 | DMA CONTROLLER |
| 0020-0021 | 2 | INTERRUPT CONTROLLER #1 |
| 0022-0023 | 2 | SC400 REGISTER SPACE |
| 0040-0043 | 4 | TIMER CONTROLLER |
| 0060, 0064 | 2 | KEYBOARD CONTROLLER |
| 0061 | 1 | NMI, SPEAKER CONTROL |
| 0070,71 | 1 | RTC REGISTERS |
| 0080 | 7 | DIAGNOSTIC PORT |
| 0081-0083, 7, 9-B | 7 | DMA PAGE REGISTERS |
| 0080, 4-6, 8, C-F | 9 | GENERAL REGISTERS |
| 0092 | 1 | CPU RESET |
| 0094 | 1 | VGA SETUP ENABLE REGISTER |
| 00A0-00A1 | 2 | INTERRUPT CONTROLLER #2 |
| 00C0-00DF | 32 | DMA PAGE REGISTERS |
| 00EE | 1 | FAST CPU RESET |
| 00F0 | 1 | RESET NUMERIC ERROR?? |
| 0102 | 1 | VGA SETUP REGISTER |
| 0200 | 1 | DIAGNOSTIC PORT (OPTIONAL) |
| 0240-0247 | 8 | AUDIO |
| 02F8-02FF | 8 | COM2 (ON SC400) |
| 0300-031F | 32 | NETWORK |
| 0378-037F | 8 | PARALLEL PORT REGISTERS |
| 03B4, 5, A | 3 | VGA REGISTERS |
| 03C0-03CF | 16 | VGA REGISTERS |
| 03D4, 5, A | 3 | VGA REGISTERS |
| 03E0,1 | 3 | PCMCIA CONTROLLER INTERFACE |
| 03F8-03FF | 8 | UART-PORT 0 (COM1) |
| 046E8 | 1 | VGA ENABLE |
| | | |

FIG. 9

| INTERRUPT LEVEL | HARDWARE INPUTS | DEVICE | DESCRIPTION |
|---|---|---|---|
| 0 | INTERNET | 8254 TIMER | SC400 |
| 1 | PIRQ1 | KEYBOARD | KEYBOARD CONTROLLER(82C42) |
| 2 | | N/A | |
| 3 | INTERNAL | COM2 | SC-400 |
| 4 | PIRQ4 | COM1 | 16C2552 |
| 5 | | PCMCIA | SC-400 |
| 6 | PIRQ6 | AUDIO | CS4231A |
| 7 | INTERNAL | PARALLEL PORT | SC-400 |
| 8 | INTERNAL | RTC. | SC-400 |
| 9 | PIRQ2 | VGA/EXT | GD-5440, EXPANSION CONNECTOR |
| 10 | PIRQ7 | ETHERNAL | GS8900 |
| 11 | PIRQ3 | MOUSE | KEYBOARD CONTROLLER |
| 12 | PIRQ5 | | |
| 13 | | | |
| 14 | | | |
| 15 | | | |

FIG. 10

| DMA CHANNEL | HARDWARE INPUTS | DEVICE | DESCRIPTION |
|---|---|---|---|
| 0 | INTERNAL | IR(NOT USED) | |
| 1 | INTERNAL | IR(NOT USED) | |
| 2 | INTERNAL | PC-CARD | |
| 3 | INTERNAL | PC-CARD | |
| 4 | ---------- | ---------------- | |
| 5 | DMA0 | EXTERNAL/PC-CARD | |
| 6 | DMA0,1 | AUDIO | |
| 7 | MDA0,1 | NETWORK | |

FIG. 11

| CHIP SELECT | USCD FOR | DEVICE | ADDRESS RANGE |
|---|---|---|---|
| IOCS0 | DUART | 16C1550 | I/O 03F8-03FE |
| IOCS1 | AUDIO | CS4231A | I/O 0240-0247 |
| MEMCS0 | NETWORK | CS8900 | MEMORY 0280,0000,0280,FFFF |
| MEMCS1 | NOT USED | | |
| KBCS | KBCTRL | 82C42 | I/O 0060,0064 |

FIG. 12

METHOD AND APPARATUS FOR DISPLAY OF WINDOWING APPLICATION PROGRAMS ON A TERMINAL

CROSS-REFERENCE TO RELATED APPLICATIONS

This is a continuation application of U.S. application Ser. No. 09/400,733, filed on Sep. 21, 1999 and issued as U.S. Pat. No. 7,720,672 on May 18, 2010, which is a continuation-in-part application of U.S. application Ser. No. 09/342,311 filed on Jun. 29, 1999, now abandoned which is a continuation application of U.S. application Ser. No. 08/581,168 filed on Dec. 29, 1995 and issued as U.S. Pat. No. 5,918,039 on Jun. 29, 1999. U.S. application Ser. No. 09/400,733 also claims the benefit of U.S. Provisional Application No. 60/101,319 filed on Sep. 21, 1998. All of the aforementioned patents and applications are hereby incorporated by reference and made a part hereof.

FIELD OF THE INVENTION

The present invention relates generally to methods and apparatus for displaying information on a terminal, and more particularly relates to methods and apparatus for formatting and displaying, on a terminal, graphical user interfaces such as the Microsoft Windowsg® operating environment and applications programs within such environments.

BACKGROUND OF THE INVENTION

Graphical user interfaces such as the Microsoft Windows' operating environment comprise the most popular operating environment for the world's best selling applications software. Such environments are typically preferred because of ease of use, uniformity of user interface, high quality display, as well as other reasons. However, such user environments were designed for use with workstations and microcomputers such as personal computers. Such workstations and microcomputers, while flexible, present difficulties with security, reliability, ease of administration, and value. While data terminals are known to offer the advantages of improved security and ease of administration relative to microcomputers, usually at lower cost, terminals have generally been unable to provide compatibility with the most popular graphical user interfaces. Terminals operating in the X environment can provide some graphical interface capabilities operating under UNIX, but typically are expensive, require extensive memory, and offer little compatibility with the most popular Windows environments.

Another option known in the prior art is diskless PCs. However, diskless PCs offer several deficiencies. In most instances, diskless PCs operating in a client server environment display application program information by downloading the application from the server and executing the application locally. This requires the diskless PC to have whatever processing power is required for each application it attempts to execute. In today's environment, this can require eight or more megabytes of memory, per application, a powerful processor, and so on making a diskless PC expensive. In addition, diskless PCs offer limited security and can require extensive administration.

The Windows NT operating system provides a robust network client/server environment, while at the same time offering compatibility at the applications program level with the popular Windows environment. However, the NT operating system was written for PC clients, and not terminals. As a result, NT clients are generally required to be robust and, as a result, expensive. In addition, Windows NT was written for the client/server environment, and not the multi-user environment. The Multi-User NT operating system offered by Citrix Systems, Inc., modifies the Windows NT operating system by extending it to operate in a multiuser environment, although the prior art application for Multi-User NT has been PCs clients as opposed to terminals.

There has therefore been a need for a terminal that is relatively inexpensive, reliable, easy to administer, secure and capable of displaying application program information within a multiuser Windows operating environment.

SUMMARY OF THE INVENTION

The present invention provides an elegant solution to the shortcomings of the prior art, in that it provides an inexpensive terminal capable of displaying applications software compatible with a windowing environment.

According to one aspect of the present invention, a terminal for communicating with a server includes a network interface for communicating with a server and a processor coupled to the network interface for operating with the network interface and for accessing a windows application resident on the server without executing locally the windows application resident on the server.

According to one aspect of the present invention, a terminal for communicating with a server includes a network interface for communicating with a server and a processor coupled to the network interface for operating with the network interface and for providing windowing functionality to permit use of a windows application resident on the server without requiring more than windowing information of the windows application to be transmitted from the server, wherein the windowing information includes application data.

According to one aspect of the present invention, a terminal for communicating with a server includes a processor for receiving windowing information supplied by a program executing on a server. The server is for running a multi-user operating system, and the program is resident on the server. The terminal further includes one or more memories coupled to the processor, wherein the total amount of the one or more memories in the terminal is less than the total amount of one or more memories in the server.

According to one aspect of the present invention, a terminal for communicating with a server includes a network interface for communicating with a server and a processor coupled to the network interface for operating with the network interface and for providing windowing functionality to permit use of a windows application resident on the server. The terminal does not include a hard disk, and the terminal is for providing an appearance that is essentially the same as an appearance provided by a personal computer.

According to one aspect of the present invention, a machine-readable medium includes software code for communicating between a terminal and a server. The software code is for performing the steps of: operating with a network interface; accessing a windows application resident on the server without executing locally at the terminal the windows application resident on the server; and providing windowing information to a display.

According to one aspect of the present invention, a machine-readable medium includes software code for communicating between a terminal and a server. The software code is for performing the steps of: operating with a network interface; providing windowing functionality to permit use of a windows application resident on the server without requiring more than windowing information of the windows application to be transmitted from the server to the terminal, the windowing information including application data; and providing windowing information to a display.

According to one aspect of the present invention, a machine-readable medium includes software code for communicating between a terminal and a server. The terminal has one or more memories, and the total amount of the one or more memories is less than the total amount of one or more memories in the server. The software code is for performing the steps of: operating with a network interface; receiving windowing information supplied by a program executing on the server, the server for running a multi-user operating system, the program resident on the server; and providing windowing information to a display.

According to one aspect of the present invention, a machine-readable medium includes software code for communicating between a terminal and a server, wherein the terminal has no hard disk. The software code is for performing the steps of: operating with a network interface; providing at the terminal windowing functionality to permit use of a windows application resident on the server; and providing at the terminal an appearance that is essentially the same as an appearance provided at a personal computer.

According to one aspect of the present invention, a terminal includes a display coupled to the processor for displaying information or windowing information from the windows application and an input device coupled to the processor for receiving an input from a user. According to another aspect, a terminal includes a display coupled to the processor for displaying windowing information from a program executing on the server. According to yet another aspect, a terminal includes a display coupled to the processor for displaying information from the windows application resident on the server and for displaying an appearance that is essentially the same as the appearance provided by a personal computer.

According to one aspect of the present invention, a terminal is a thin-client device.

DESCRIPTION OF THE DRAWINGS

The drawings that form a part of the disclosure herein:

FIG. 7B1-7B3 show the data structures associated with the configuration software of the present invention.

FIG. 8 is a table showing a memory address configuration.

FIG. 9 is a table showing an I/O address map configuration.

FIG. 10 is a table showing interrupt assignment configuration.

FIG. 11 is a table showing a DMA channel assignment configuration.

FIG. 12 is a table showing a chip select configuration.

DETAILED DESCRIPTION OF THE INVENTION

Figure 1:
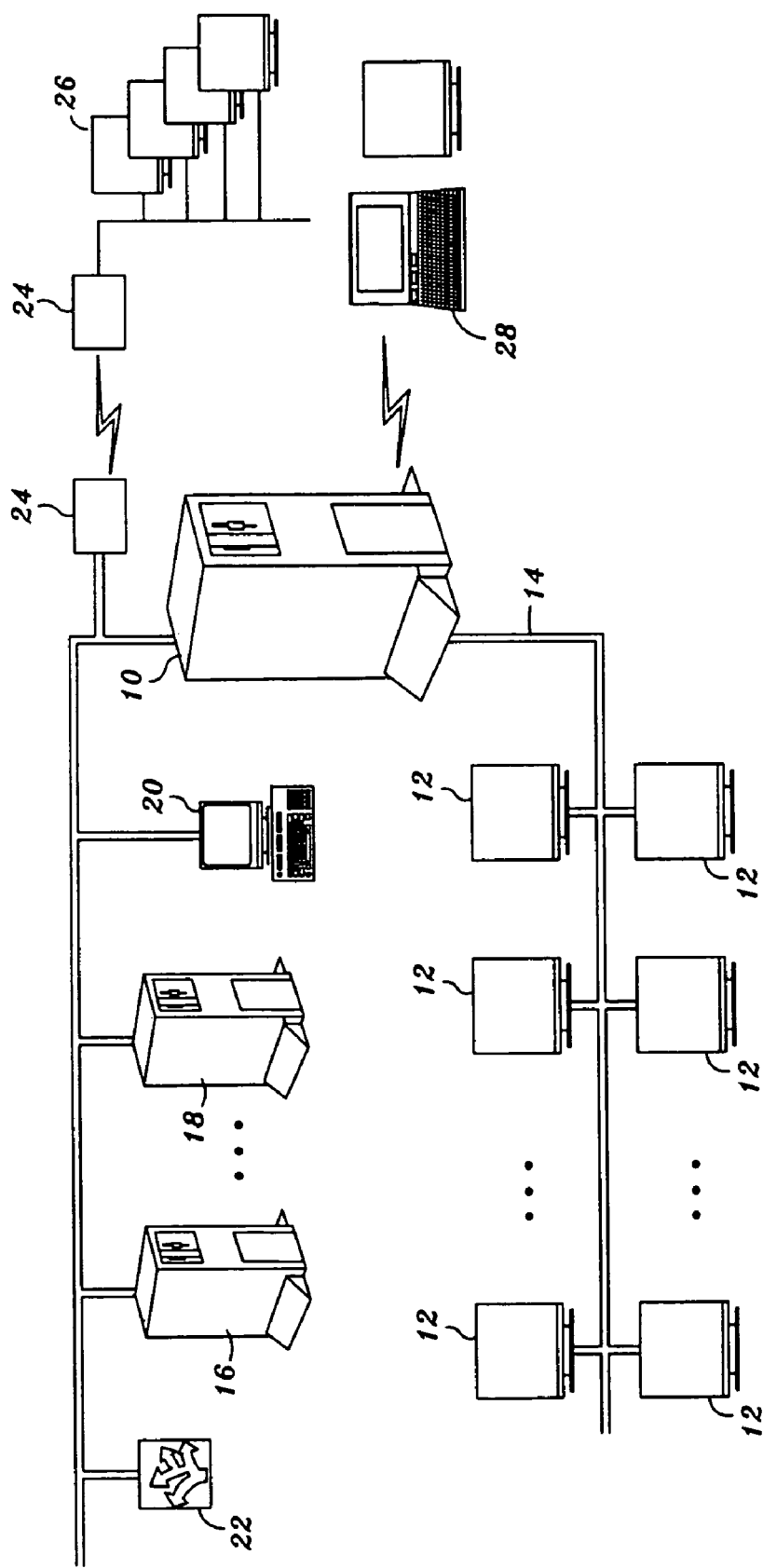
FIG. 1 shows a generalized arrangement of an application server and a terminal in accordance with the present invention.

It is to be understood that both the foregoing description and the following detailed description are exemplary and explanatory and are intended to provide further explanation of the present invention.

According to one aspect, the present invention provides a display terminal capable of communicating with an applications server running a multi-user operating system. This provides secure access to Windows applications at the desktop. In an exemplary configuration, an application server is provided in the form of any suitable computer running the Multi-User NT operating system provided by Citrix Systems, Inc. The Multi-User NT operating system incorporates the Windows NT operating system plus extensions implementing a display protocol known as ICA3 as well as multi-user capabilities.

The terminal includes, in an exemplary embodiment, a hardware architecture based on the Intel X86 processor line. In addition, the terminal offers only limited main memory, and is generally incapable of local execution of modern application programs such as word processing, graphics, database, or other popular programs, or even the Windows or DOS operating system itself. In this way the terminal of the present invention is distinctly different from prior art X terminals or diskless PCs, or other PCs configured in a client/server environment.

Importantly, the hardware architecture does not implement the conventional IBM PC/AT bus, and the firmware within the terminal implements neither standard PC/AT BIOS nor a standard PC-compatible disk operating system. The terminal firmware implements network access extensions compatible with the application server, again, for example, the ICA-3 extensions available from Citrix Systems. A high-resolution graphical display is provided both for ease of use and may be monochrome (including grayscale) or color, as well as input/output devices typical of the Windows environment such as mouse, keyboard, touch screen and other I/O services.

In addition, the terminal includes a network interface capable of communicating with the application server across conventional RS232 lines, Ethernet connections, wireless, ISDN, fiber optic, AC power-line modems, cable or other connections. When connected to the application server, the terminal displays the Windows NT or Windows 95 operating environment, including any application programs executing on the server and accessed by the user of the terminal. In the exemplary arrangement, the terminal appears to the user essentially the same as a much more expensive, less secure, harder to manage personal computer. As a result, during operation the terminal of the present invention offers numerous features normally associated with a multi-user system, while at the same time offering many of the desirable features typical of a client/server environment.

The terminal includes transferring file information to and from the terminal and for automatically downloading images via file transferring protocol to the terminal over a network link from any network server between the processing means and the display means after the terminal has obtained information by the Dynamic Host Configuration Protocol. The terminal also includes using communications protocols for an interactive or automated download of a new image via a network. Enhancements to the Simple Network Management Protocol and user interface are provided along with means for downloading binaries to a terminal.

The present invention provides a terminal or a utility for executing on a terminal, server or both. The terminal displays application program information in a windowing environment including processing means, not fully compatible with personal computer BIOS or disk operating systems and incapable of executing windowing applications locally, adapted to receive windowing information supplied by programs executing on a remotely located application server and a display for the windowing information supplied by programs executing on the remotely located application server. File information is transferred to and from the terminal using a communications protocol. One or more image upgrades can be transferred to the terminal from the remotely located application server. Configuration data for the terminal can also be transferred to the terminal from the remotely located application server.

The terminal can further include automated downloading for one or more images to the terminal through a network link between the processor and the display after the terminal has been assigned an Internet Protocol address such as by a Dynamic Host Configuration Protocol. The terminal can include: providing configuration settings for the terminal using simple network management protocol; providing an interactive or automated downloading of an image through a network using simple network management protocol; creating or modifying binaries in the remotely located server with customized configurations from a tool kit; downloading the binaries to the display means via parallel, serial, flash card paths or an automated or interactive transfer using a communications protocol; merging automated configuration file and workspace images; administrating the configuration settings of the terminal from the remotely located server using a communications protocol; providing configuration settings for the terminal using a Management Information Base located on the remotely located server.

The present invention also provides a method for displaying application program information in a windowing environment. The steps of the method include: sending windowing information supplied by programs executing on a remotely located application server to a terminal not fully compatible with personal computer BIOS or disk operating systems and incapable of executing windowing applications locally; displaying the windowing information supplied by programs executing on the remotely located application server; and transferring file information to and from the terminal using a communications protocol.

The present invention further provides a terminal or a utility for executing on a terminal, server or both. The terminal displays application program information in a windowing environment including processing means, not fully compatible with personal computer BIOS or disk operating systems and incapable of executing windowing applications locally, adapted to receive windowing information supplied by programs executing on a remotely located application server, and display means for displaying the windowing information supplied by programs executing on the remotely located application server. More than one connection between the terminal and server is simultaneously maintained. The multiple connections include establishing more than one virtual machine on the terminal. Each virtual machine runs an open session. The writing of a screen stops and redisplays when a session is moved to the background without saving the screen in memory. Each virtual machine has a text buffer so when the virtual machine is in the background it has a virtual buffer that it can write to and it continue to run in the background. Each virtual machine sends a signal to a graphics application should a graphic need to be displayed. The application sends a signal out to the server to command it to stop sending display when the application is switched to the background so that traffic relating to the graphics application between the terminal and server is stopped. The server is commanded to redisplay the screen when the application is switched back to the foreground. Each virtual machine stops sending and receiving data to and from the server when an application resides in the background session. Each virtual machine commands the server to refresh the data for the application when the application is switched to the foreground.

The present invention provides a method for displaying application program information in a windowing environment that includes the steps of: sending windowing information supplied by programs executing on a remotely located application server to a terminal not fully compatible with personal computer BIOS or disk operating systems and incapable of executing windowing applications locally; displaying the windowing information supplied by programs executing on the remotely located application server; and simultaneously maintaining more than one connection between the terminal and server.

I. Hardware Description

Referring now to FIG. 1, a simplified system is shown in accordance with the present invention. In particular, a single application server 10 communicates bidirectionally with one or a plurality of terminals 12 over a suitable network or other communications link The network link may be an RS232 line, an AC power line modem, or an Ethernet connection such as twisted pair or coaxial cable, or another suitable link such as fiber optics. In an exemplary arrangement, which has been determined to operate satisfactorily, the application server is running an operating system such as Windows NT with appropriate extensions, such as those offered by Citrix as the Winframe OS. The Citrix remote Windows protocol or extensions include the ICA 3.0 protocol as well as enhancements that provide true multiuser capability within the Windows NT environment. For such a configuration, the application server may be, for example, a personal computer based on an Intel Pentium or '486 processor or other similar processors such as a DEC Alpha or a MIPS processor, or multiple processors, together with a suitable amount of RAM. In an exemplary configuration, the server may have sixteen megabytes of RAM for Winframe OS, plus 1-8 megabytes of RAM per concurrent user, depending on the particular application being run by the user.

In appropriate configurations, the application server 10 may also communicate with other servers, including a NetWare file server 16, a Unix host 18, other personal computers 20, or an Internet gateway 22. Also, through other connections such as a router or other communications server 24, the application server 10 may also communicate with remote terminals 26, or by other means to remote dial-up users 28.

Figure 2:
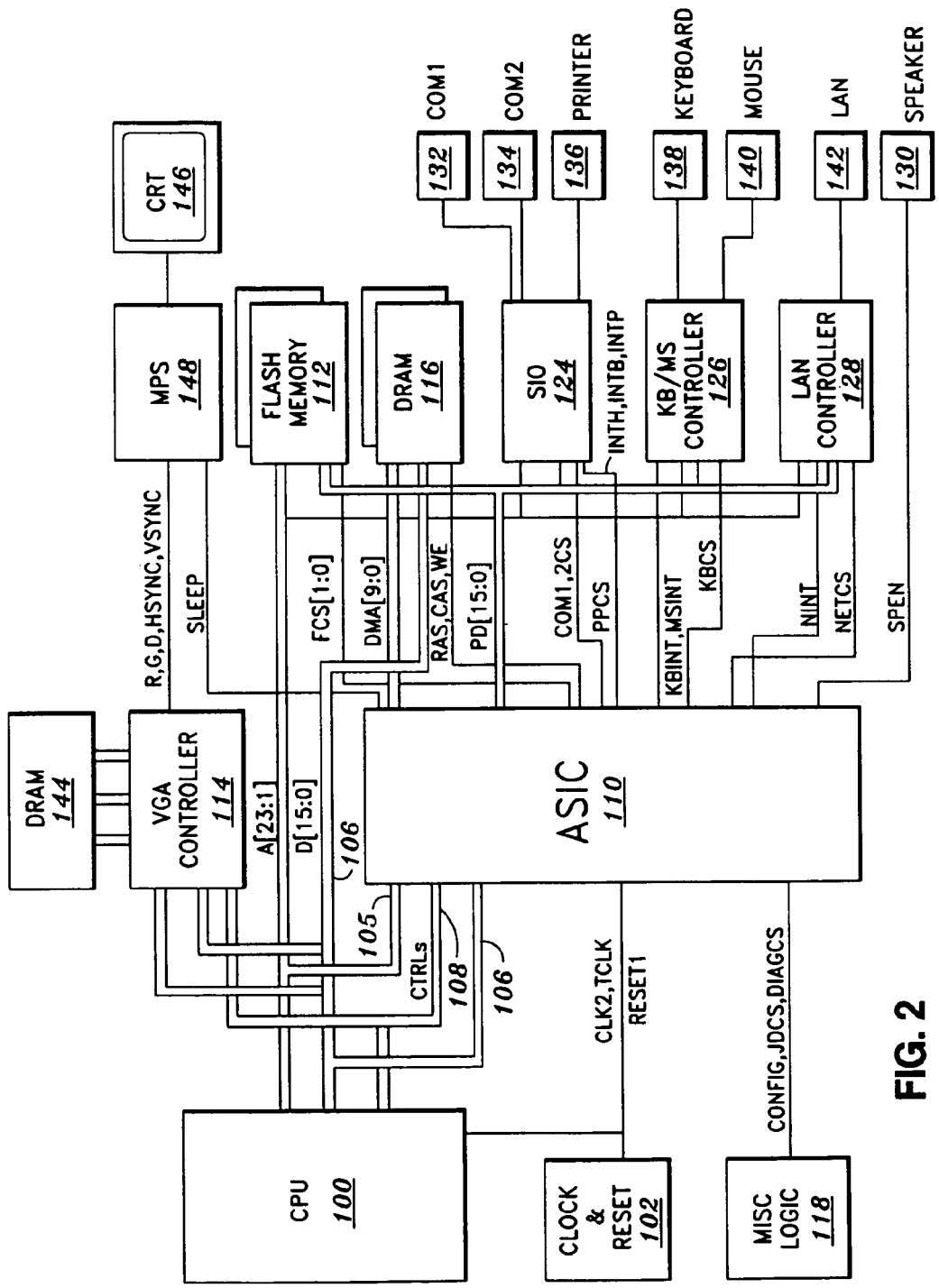
FIG. 2 shows in functional block diagram form the architecture of the logic of the present invention.

FIG. 2 illustrates an Elan SC400 system controller 100 for the Winterm BASE-2A Windows system terminal. The Winterm BASE-2A (Windows) system is the Windows terminal for the Winterm product line. The Windows system uses an off-the-shelf embedded controller that integrates most of the logic found in the original Winterm BASE-1 design into a single chip to achieve lower cost and higher performance. This system is an improvement to the BASE-1 Winterm design in hardware and in software. The controller 100 includes a 486DX-66 embedded controller with a DRAM controller, an Interrupt Controller, a DMA controller, a Timer/Tone generator, a PCMCIA expansion interface, a built-in Serial Port interface (used as COM2), a built-in Enhanced Parallel Port interface, a Built-in XT Keyboard interface, a Local peripheral interface bus with chip selects, a VL Bus Interface, a Flash memory interface, and an ISA/Local peripheral bus with chip selects.

Figure 3:
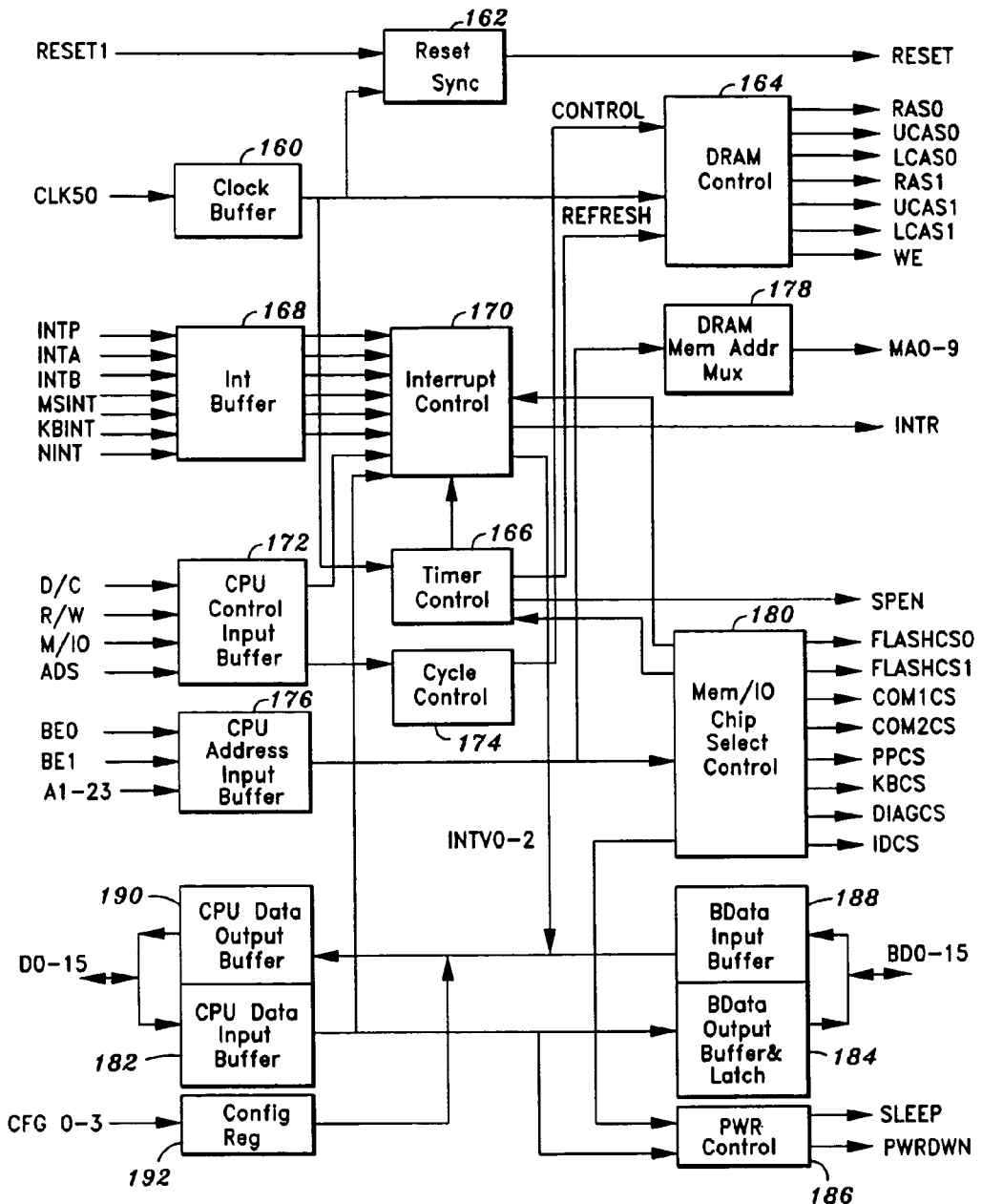
FIG. 3 shows in block diagram form the architecture of the control ASIC of FIG. 2.

FIG. 3 shows in block diagram form the controller of FIG. 2 and the main system components for a terminal in accordance with the present invention. A Super VGA 110 with built-in RAMDAC supports up to 86 MHz dot clock (on VLB). Four banks of DRAM 120 (32 bit wide, up to 32 MB in total) are provided. Three banks of FLASH memory 132, 135 (8 or 16 bit wide) are provided. One UART 140 (used as COM 1) provides an EIA-232D interface, an Ethernet Controller (on ISA) 150 is provided, and a Keyboard and Mouse Controller 160 is provided. An audio Codec 165 is provided. The system includes a VL Bus 170 and an ISA/Local peripheral bus 180.

The system incorporates the AMD SC400 Embedded Processor 100 that integrates most of the core logic and a 486 SLE CPU on chip. The system supports a VL Bus 170, an ISA Bus 180, and PCMCIA interface 190.

Four banks of DRAM 120 (32 bit wide, up to 36 MB in total) are arranged in four DRAM banks as two on-board banks while the other two are in a double sided 72 pin DIMM. Banks 0 and 2 are assigned to be on board and are 4 Mbytes each. Banks 1 and 3 are arranged as a double sized DIMM that supports 1, 2, 4, 8, 16 and 32 Mbytes standard 32/36 wide DIMMs. A combination of software detection and hardware settings can concatenate all active DRAM banks to form one contiguous DRAM memory map.

The system has four flash devices 130, 132 designed to be on board but is only able to support up to three FLASH memory banks at the same time. The first device is a BOOT/FILE FLASH. The second device is a FILE SYSTEM FLASH and the third is a NAND FLASH. The fourth device is an 8-bit ROM/FLASH on a socket. The devices are routed through a set of jumpers and a couple of zero ohm resisters. The first and second banks of the FLASH are controlled by SC400 directly. The third bank is controlled by ROM2CE from SC400 through a 16V8 PLD, but can be routed to the FILE SYSTEM FLASH directly. The BOOT/FILE FLASH supports either of 4 Mbit and 8 Mbit BOOT FLASH devices in 256K×16 or 512K×16 forms, or a 16 Mbit FILE SYSTEM FLASH in 1M×l6 form. The second FLASH device supports 16 Mbit (with one chip select) and 32 Mbit (with two chip selects) FILE SYSTEM FLASH devices. The third FLASH supports the Toshiba NAND FLASH interface.

A BOOT ROM/FLASH socket is provided for system boot, housekeeping and testing. The BOOT ROM can be located at either the first or the second FLASH bank by a set of jumpers. The BOOT ROM uses an 8 bit interface and is installed in a 32 pin PLCC socket. The ready/busy status can be read from SC400 GPIO16 for FLASH ROM device 1 and 2. This status indicates the FLASH memory chip is in an erase or programming operation. The system is bootable from BOOT ROM, BOOT/FILE FLASH and FILE SYSTEM FLASH, but not NAND FLASH. A set of jumpers (JP 1) is used to route the chip selects to FLASH ROMs. Another jumper (JP 2) controls the bus width for the boot device.

The system uses an external keyboard controller 160, which is a VT82C42 with 74LS05 buffer for keyboard and mouse.

The Winterm system requires two RS232 serial interface ports, including an external UART chip 140. A serial port clock is provided by an external crystal (1.8432 MHz).

The SC400 provides an EPP compatible parallel port with external buffering. A set of data buffers is needed to provide bi-directional and output latch. The control signals are directly connected to the port.

The system supports one PCMCIA slot 190. This PCMCIA interface is shared with the ISA interface without extra buffering.

The system uses the CS8900 network chip 150, which directly interfaces with the ISA bus.

The system design supports the CS4231 Audio CODEC chip that buffers the stereo input and output to/from the chip.

For a video graphics interface, the system uses a Cirrus Logic CL-GD5440 VGA chip on the 32 bit VL bus 170. The frame buffer of the VGA chip supports 512 Kbytes (256K× 16×1) and 1 Mbytes (256K×16×2). The VGA graphics interface resolution is 1024×768×8 at 75 Hz.

The system provides four different buses: DRAM bus, VL bus, ISA bus, and local bus.

The DRAM bus connects to the DRAM devices, including on board DRAM and, if present, the DIMM. The data bus (D[0:31] comes from the SC400 and is shared with other devices. The address bus (MA[0:12]) is dedicated to DRAM access only.

For the VL-Bus, the data bus (BD[0:311]) is a buffered version of the SC400 bus. The high side of the bus (BD [16.31]) provides service to the ISA and local bus. The address bus for VLB comes from the SC400. The control signals for VLB are connected to the SC400 directly. The only other device on VLB is the GD-5440 SVGA chip.

The data bus for ISA is shared with other peripheral buses (BD[16:31]). The SC400 routes the word or byte on the ISA bus to the correct rail internally or by swapping. The address bus (SA [0:25]) also connects to the SC400 address bus directly. The control signals come from the SC400.

The SC400 provides a high-speed local bus with internal chip selects. There are six chip selects from the SC400, two for I/O devices, two for memory devices, one for FLASH ROM, and one for the external keyboard controller. The bus is as fast as 33.3 MHz or as slow as the ISA bus. The data bus (BD[16:31]) is the same buffered bus as VLB and the address bus (SA[0:25]) is connected to the SC400

A simple RC circuit generates the system-reset signal with a DS1233A reset generator chip as a backup. The VL bus has its own reset that is provided by the SC400 under program control. The keyboard controller reset input also is connected to VLB reset due to timing requirements. The IDS bus provides another reset signal (RSTDRV) to all the peripherals that require positive reset signal.

The graphic controller chip 110 is fully programmable to various video timing standards, as required. The buses are typically not compatible with the IBM PC/AT standard, nor any other personal computer standard.

In a special feature of the hardware of the present invention, the terminal operating system stored in the flash memory 112 may be updated through a variety of methods, including communication through a suitable interface. In an exemplary embodiment, the flash memory may be updated through communication with a host system when the terminal is placed in a predetermined state. In such an arrangement, downloading to the terminal's memory system is suitable such as by using three boot block download methods that occur at power up of the terminal and occur over the serial or parallel port into a PC card. At terminal power up a download is checked automatically. After power up a download is checked by the SNMP or DHCP, which are "enabled" any time the network is up.

Configuration information is generally included with the firmware image, so there is usually only one download. It is possible to download just the configuration information. Downloaded information is always received into DRAM first and then written to flash memory. Serial, parallel, or flash card download will occur automatically at boot time if there is an appropriate agent available to receive the download from. DHCP-initiated downloads occur when the network driver loads, if DHCP updates are enabled in the user configuration, and if a new firmware image is available. SNMP-initiated downloads can occur any time after the network driver loads if SNMP downloads are enabled in the user configuration. SNMP updates are initiated by external SNMP requests to the terminal.

II. Terminal Operating System

Figure 4:
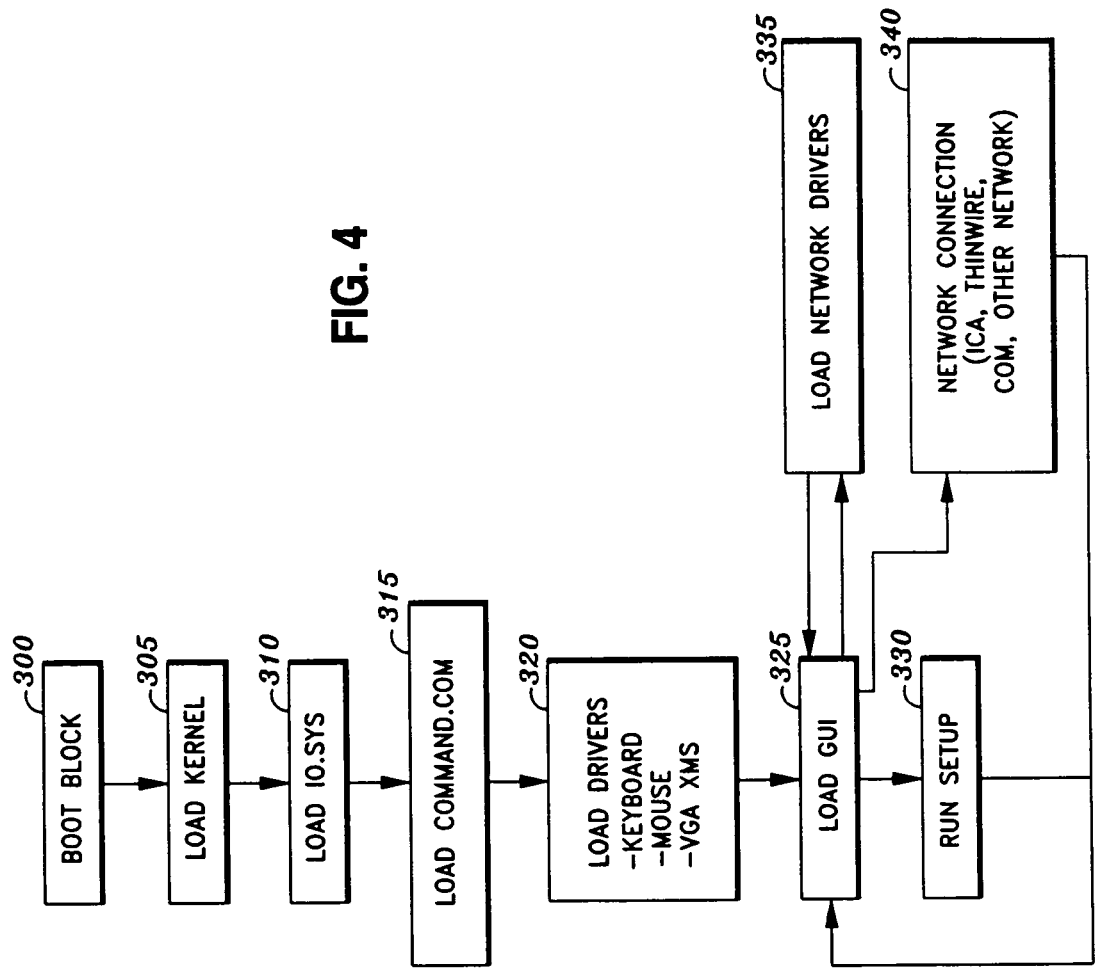
FIG. 4 shows an overview of the software architecture of a terminal in accordance with the present invention.

Referring next to FIG. 4, the key elements of one embodiment of the terminal operating system of the current invention may be better understood. The hardware of the present invention is compatible with a standard AT-bus design and is preferably configured for a National 5440 graphics processor.

However, the present invention can also be configured for non-standard AT-bus designs. In such an example, the present invention relies on firmware to provide the requisite BIOS services to the upper software layers. The firmware is designed to run in virtual 8086 mode, with AT-compatible hardware components such as the interrupt controllers and timers being emulated in software as closely as possible. In addition, while a standard keyboard controller is used in an exemplary embodiment, in the event a non-standard controller is used the interface to such a device would also be emulated.

In the preferred embodiment, the AT-bus compatible hardware does not require emulation of all of the components. However, the creation of multiple virtual machines by the present invention requires emulation of a number of these components. The kernel listed in Appendix A runs in the CPU's virtual mode for an 8086 processor. Signals such as I/O from and to the ports of such hardware components are intercepted to facilitate the emulation. Also, under the control of an emulated A20 gate, the memory management features of the processor could be enabled to simulate the wraparound, which occurs in normal hardware at one megabyte. The emulation also provides for mapping memory pages or accessing a particular piece of hardware so that multiple applications do not attempt to access one piece of hardware without serialization or control. For example, the interrupt codes listed in Appendix A must be mapped to match a piece of hardware such as a mouse to the appropriate session containing the mouse because there is only one copy of the mouse driver loaded. The session containing the mouse may or may not be the foreground session.

Continuing with reference to FIG. 4, the terminal operating system begins execution with a boot block 300, followed by loading of a kernel 305. The kernel 305 provides many of the intercepting and remapping functions of the present invention, as more particularly explained hereinafter. Upon completion of the kernel 305, the IO.SYS code 310 is loaded. Next the COMMAND.COM code 315 is loaded followed by executing commands provided by an AUTOEXEC.BAT file. The AUTOEXEC.BAT file may include, for example, keyboard and mouse drivers although both such drivers may not be used in every instance, as well as a VGA XMS driver. It may also include other optional code, including starting a self-test sequence, which executes if appropriate conditions exist. In an exemplary embodiment, a loopback plug installed in a communications port causes the self-test sequence to execute.

The GUI.COM code 325 is then loaded. At this point, depending on the implementation, either the system will enter setup mode, or user commands may cause either an entry of the setup mode or the loading of network connection code. In a presently implemented embodiment, the system enters the setup mode to obtain current configuration data, and then continues with loading of the network connection code.

If the implementation permits the user to select, and if the user selects the setup mode, the GUI.COM 325 branches to run the SETUP, or GUI 330. If the setup mode was not selected, the GUI.COM 325 cooperates in the loading and unloading of network drivers at 335 and begins the running of network connection code (again, ICA, thin wire, corn, or other network) at 340. In a presently preferred embodiment, the network connection code includes a substantially modified version of the Winframe for DOS client, the standard version of which is available from Citrix Systems, Inc.

Figure 5:
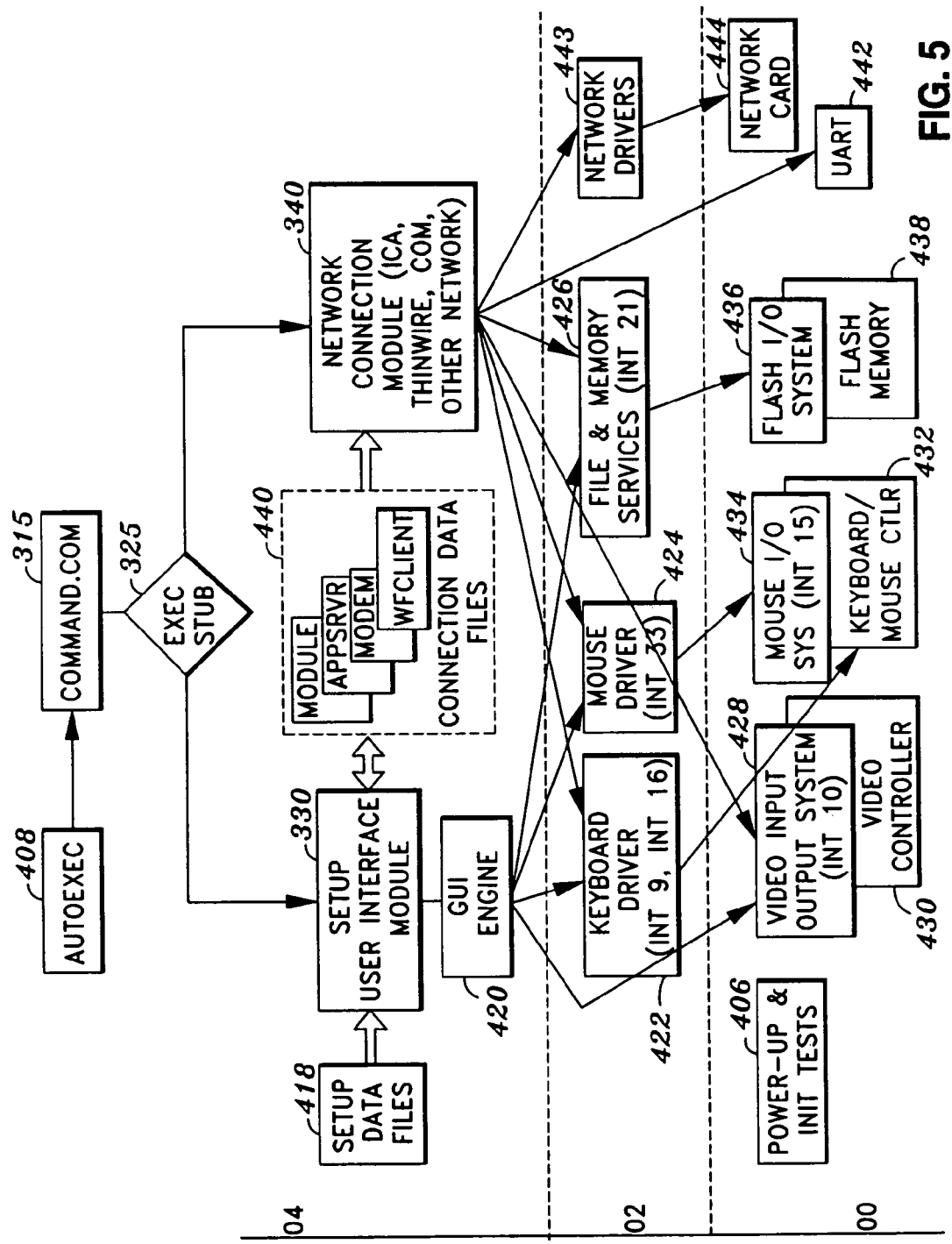
FIG. 5 shows in simplified block diagram form the setup interface between the GUI Engine and the remainder of the system.

Now referring to FIG. 5, the cooperation of the terminal operating system and the hardware architecture of the present invention may be better appreciated. In particular, the lowest layer shown in FIG. 5 is the Input/output system and hardware layer 400. The next higher layer is the Driver layer 402, while the top layer is the Application layer 404.

At power-on, the power-up and Init tests 406 in the hardware layer are performed as part of the boot block 300. The power-up and Init tests 406 execute partly out of the flash memory system 112 and partly out of RAM 116. Once the power on self tests are completed, the terminal continues with the boot sequence described generally above in connection with FIG. 4, including the remainder of the boot block 300, an AUTOEXEC sequence 408, and the COMMAND.COM sequence indicated at 315. Both the AUTOEXEC and COMMAND.COM files are maintained in the flash memory After the terminal's COMMAND.COM sequence executes, it causes the AUTOEXEC file to load. The AUTOEXEC in turn causes the GUI.COM 325 to load. As noted above, the GUI.COM sequence 325 can branch either to the Setup Module 330 or the Network Connection module 340. At initial installation or any time thereafter that operating parameters of the terminal require verification or changing, the Setup Module 330 is run. The Setup Module 330 receives information from one or more setup data files 418 and starts the GUI engine 420. The GUI engine 420 in turn communicates with a keyboard driver 422, mouse driver 424, and the files and memory services driver 426 of the terminal operating system. In addition, the GUI engine 420 also communicates with the video Input/output system 428, which in turn provides data to the video controller 430, which may for example be based on a Cirrus 5429 graphics processor, to generate a video display during the setup sequence. The setup sequence will be described in greater detail in connection with FIG. 5.

The keyboard driver 422 in turn communicates with the keyboard controller hardware 432, which may, for example, be a conventional PS/2 keyboard Input/output system, a universal serial bus (USB) interface, and in at least some embodiments may also include a four wire keyboard interface such as that described in the aforementioned U.S. Pat. No. 4,706,068. Likewise, the mouse driver 424 is typically also communicating at appropriate times with a mouse input/output system 434. Throughout such operations, the terminal operating system's flash file and memory services portions 426 will typically be executing out of flash and RAM.

As discussed in greater detail in connection with FIG. 5, the setup process permits the user to specify the configuration information of the terminal, including such parameters as network interface and related configuration details, language, colors, and other parameters. Once these parameters are specified, the data is stored in the connection data files 440

At this point the user is ready to exit the terminal setup module 414, and return to the GUI.COM. When allowed to continue, the GUI.COM process 412 can be caused to branch to the network connection module 416. The network connection module 340 initiates by retrieving the data stored in the connection data files 440 and the command line of the connection module, thereby communicating to the application server how to talk to the rest of the driver and hardware layers of the terminal. In particular, the network connection module communicates with the keyboard driver 422, the mouse driver 424, the video input/output system 428, and the file and memory services portion 426 of the terminal operating system. In addition, the network connection module also connects a hardware serial interface 442 as well as, in some embodiments, a hardware network interface 444. The network drivers 444 execute out of RAM 116 in one exemplary embodiment, but may execute out of flash memory 112. The serial interface 442 may be a conventional RS232 interface, but may also be another form of serial connection, such as the Universal Serial Bus, or USB.

Figure 6:
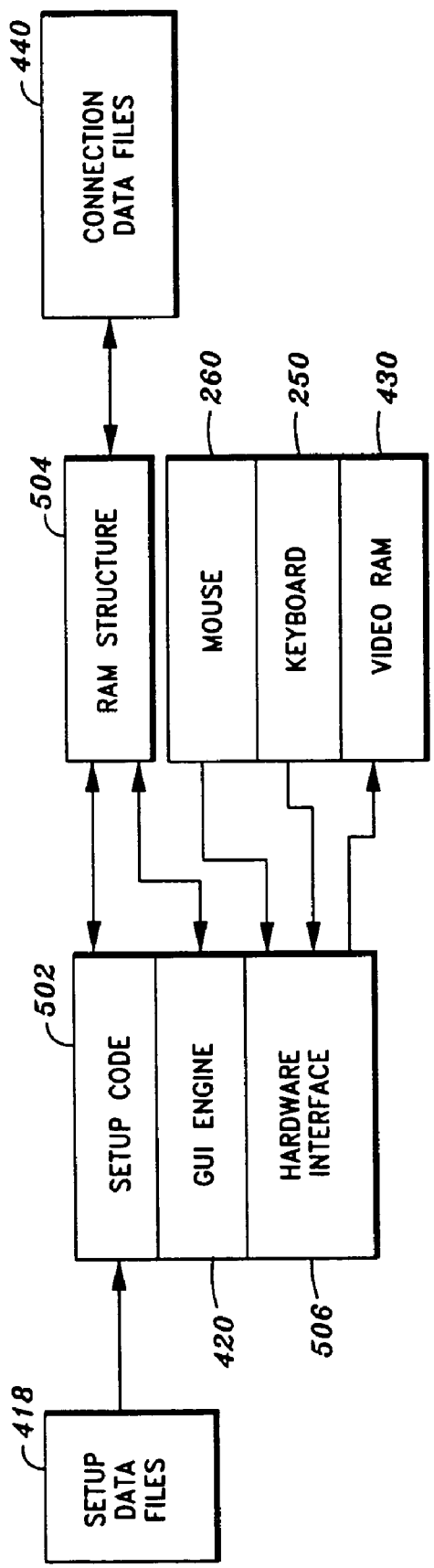
FIG. 6 shows in flow chart form a top level view of the process by which the terminal of the present invention connects to an application server.

Referring next to FIG. 6, the operation of the GUI engine 420 shown in FIG. 5 during setup module of the terminal 12 may be better appreciated. The GUI engine operates only during the setup mode, and provides a rudimentary graphical user interface during the configuration operation.

As noted in connection with FIG. 5, above, the operation of FIG. 6 begins when the setup sequence is invoked during terminal boot up. The setup sequence may be invoked from a sequence of keystrokes or any other convenient and suitable means. The setup sequence starts by calling setup code 502, which in turn pulls information from setup data files 418. The setup data files 418 identify the options available in the configuration of the terminal. The setup code 502 communicates bidirectionally with a RAM struture 504, and also causes existing connection information from the connection data files 440 to be written into the RAM struture 504. The GUI engine 420 also communicates bidirectionally with the RAM structure to set up and display current information in an arrangement described hereinafter as areas, groups and selects. In addition, a hardware interface 506 provides video information to video controller 430 while responding to information received from the user via the mouse 260 and keyboard 250.

Figure 7A:
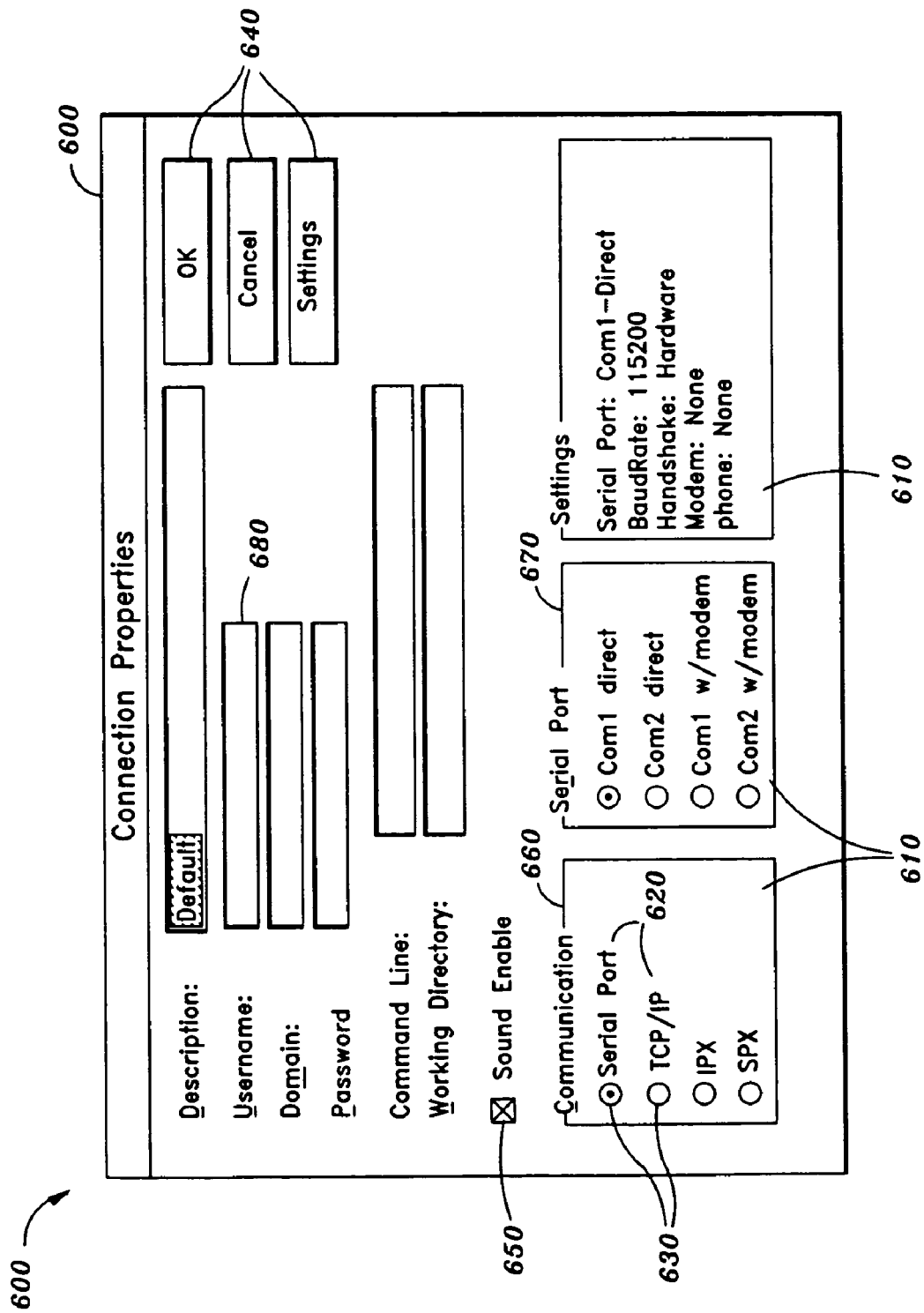
FIG. 7A shows a setup screen from the configuration software of the present invention.

The setup code permits the user to cycle through a plurality of configuration menus for the operating characteristics of the terminal, such as the language displayed on the terminal, the network connection method, and so on. Shown in FIG. 7A is an illustration of a setup screen used in the configuration mode of the terminal. In a preferred embodiment, the setup screens are displayed graphically. As the user cycles through the configuration screens, the user through use of the keyboard and mouse may selectively update the configuration data. The updated data is maintained in the RAM structure 504 before being written to the connection data files 440. However, in a presently preferred embodiment, certain of the data may be updated dynamically, while other data is not updated until the setup sequence is completed. Upon completion of the setup sequence, including writing any remaining configuration data to the connection data files 440, the setup sequence exits and returns to the GUI.COM 325 for initiation of the network connection module 340 shown in FIG. 5.

Continuing with reference to FIG. 7A, the overall window in which the data appears will be referred to herein as an area 600. Within each area 600 are one or more groups 610, and each group 610 comprises one or more selects 620. Thus, in the example of FIG. 7A, the "Communication" group includes the selects Serial Port, TCP/IP, SPX and IPX, each of which has associated therewith a region 630 indicating that select has been chosen, or selected.

III. Configuration Data Structures

Referring next to FIGS. 7B1-7B3, the data structures associated with the configuration software are shown. In particular, a list of area pointers is found in $AREA_{13}$ LIST 700. The structures pointed to by the area list include boundaries, size, title and groups attached for all areas as defined by the SETUP process. As noted previously, each area appears as a window on the screen. In addition, all areas that are currently being displayed are listed in DISP_AREA_LIST 702. In an exemplary embodiment, the first area listed is displayed as the bottom area, and the last area listed is the top area displayed. In the exemplary embodiment, overlapping of windows is permitted although 30 overlapping is not necessarily required in all embodiments.

At 704 is the data structure for GROUP_LIST, which lists all groups defined by the SETUP process in all areas found in the AREA_LIST 700. As previously noted, each area typically includes one or more groups. An optional data struture 706 for a STRING_LIST may also be provided, and a FILE_LIST 708 is provided as a directory to bitmap images which may be used in multiple instances within the various areas, groups and selects.

The structure of the AREA_LIST 700 can be seen at 710 to include a block for an area ID 712, a pointer to the next area 714, a pointer to the previous area 716, and a structure pointer 718. The structure pointer 718 associated with each area ID 712 points to an area structure 715 which includes the area ID 712 together with an ABS_X entry 720 and an ABS_Y entry 722 to give the location of that area relative to (in an exemplary embodiment) the top left corner of the display. The area structure 715 also includes a ROWS entry 724 and a COLUMNS entry 726 that together specify the size of the area. A FLAGS entry 728 specifies whether a border extends around the area. A TITLE_POSITION entry 730 and TITLE_BAR entry 732 specifies the text of the title and its location within the title bar of the particular area, while a MAX_STR_LEN entry 734 specifies the maximum number of characters which may be used for the title.

In addition, the area structure 715 also includes an entry 736 for the number of groups contained within the particular area. An AREA_MPTR entry 738 specifies the mouse pointer hot spot within the area, while an entry DEF BUTTON 740 specifies which button within the area will be the default. The default button will be activated when the "enter" key is pressed. A 25 CAN_BUTTON entry 742 specifies the cancel button, which will be activated when the "ESC" key is pressed. Finally, a list of pointers, one for each group associated with the area, is specified at 744A-744N. Each group pointer 744 points to an associated group structure block 746, discussed hereinafter. A hot key list may also be defined for the area.

The structure of the DISP_AREA_LIST, shown at 748, is essentially identical to the structure of the AREA_LIST 748, and includes blocks for area ID, next area, previous area, and structure pointer. As with the AREA_LIST 700, the DISP_AREA_LIST 748 also points to the area structure 715. A similar structure for the GROUP_LIST 704 is shown at 750, and includes a group ID 752, a next group pointer 754, a previous group pointer 756 and a group structure pointer 758. A similar structure for the optional STRING_LIST 706 may also be provided, and may include a string ID 760, a next string pointer 762, a previous string pointer 764, and a string structure pointer 766.

Referring again to the group structure pointer 758, it points to the group 10 structure block 746 and includes the group ID 752, a PARENT_SELECT_ID entry 780, to identify the select which, when activated, will automatically pop up this group, a HOTSPOT_COUNT entry 782 to identify the number of mouse hot spots within the group, and GSTART_X and GSTART_Y entries 784 and 786, respectively, to specify the relative location of the group within the area. In an exemplary embodiment, both the group and the select locations are specified relative to the top left corner of the area containing them; but other relationships may be defined that are also acceptable, such as specifying the location of a select relative to the location of its group. The most important element is to ensure that all features of an area maintain their position within the area if the area is moved.

The group structure block 746 also includes ROWS and COLUMNS entries 788 and 790, respectively, for specifying the size of the group, as well as a GFLAGS entry 792 for specifying the border of the group. In addition, a QUICK_KEY_POSITION entry 794 and a QUICK_KEY_STROKES entry 796 may also be specified for "hot" keystroke combinations associated with the group.

Further, and similar to the area structure, entries for title position 798, group label 800 and MAX_STR LEN 802 may be provided. In addition, a NUM_OF SELECTS entry 804 is provided to identify the number of selects contained within a group. Next, an entry 806 for AID_ATTACH is provided as a back reference to the area ID 712 with which the particular group is associated. The AID_ATTACH entry 806 is not required in all cases, but assists in improving performance in at least some instances. Lastly, a list of pointer entries 808A through 808N each point to a select structure associated with the particular group. As will be discussed hereinafter, a variety of select structures may be associated with each group, but some elements are common among the various types. Thus, the first pointer 808A points to a ELECT_—COMMON structure block 810. Referring again to the area structure block 715, the default button entry 740 and cancel button entry 742 also point to the select common structure block 810.

The SELECT_COMMON structure block 810 includes a select ID entry 812, an entry 814 giving back reference to the group ID, REL_X and REL_Y entries 816 and 818 together with ROWS and COLS entries 820 and 822 for specifying the location and size of the select, QUICK_KEY_POS and QUICK_KEY_CHR entries 824 and 826 for specifying the hot keystroke combinations associated with the select, a MAX_STR_LEN 828 and select string 830 for specifying the maximum size and title for the select, and an SFLAGS entry 832 for specifying the characteristics of the select.

In addition, a SELECT_TYPE entry 834 is also provided. As noted previously, different types of selects are available, and reference is again made to FIG. 7A. The different types of selects that may be provided within a group depend on the type of data required at that step for configuring the terminal. In some instances, the choices involve only the pressing of a button (see buttons 640); in others, a select involves enabling or disabling a feature, as a check box (see 650 in FIG. 7A); in others, one of several choices must be selected, as indicated in the "Communication" and "Serial Port" groups 660 and 670 of FIG. 7A. In still others, an image may be selected, while in others specific text must be selected. In some, a fill-in entry is required (680 in FIG. 7A), while in others one of many fields must be filled in. Although these are the types of selects which have been implemented in an exemplary embodiment, the list is not exhaustive and other selects can be readily implemented given the teachings herein.

For a "fill in" select, cursor start and cursor end entries 836 and 838 are provided, together with a "first displayed" entry 840 for identifying from which character on the string should be displayed. In addition, a LABEL_REL_X entry 842 is provided as well as a LABEL_REL_Y entry 844 and a LABEL_STR entry 846.

For a "one of many" select type, entries for NUM_OF_SEL_ROWS and SUM_OF_SEL_COLS 848 and 850, respectively, are provided. Entries are also provided for the number of options 852 and default option 854, as well as a quick key pointer 856 and a flag pointer 858 to identify the number of options which are active. Finally, a select size 860 is also provided.

For an "image" type of select, only an entry for the file ID 708 and an image pointer 862 must be specified.

For a "fields" type of select, a "child group" ID entry 864 is provided together with a child group pointer, which points to a group structure of the type shown in group structure block 746. The child group will be popped up automatically when the parent select is activated, and one of a group of fields is selected.

For a "list of strings" select, entries are provided for number of options 868, the maximum length of the option title (or MAX_OP_LEN) 870, a horizontal display offset entry 872 and a vertical display offset entry 874, together with X label position 878 and Y label position 880. Finally a label string 882 and a select string size entry 884 are provided.

Referring again to the AREA_MPTR entry 738, the mouse pointer hot spot is specified by a structure that includes an area ID entry 900, a group ID entry 902, and a select ID 904. In addition, an option select type 906 is provided to specify the type of select with which a particular hot spot is associated. Further, back reference entries 908 are provided for the group ID within the area, and the select ID within the group. Still further, four entries 910, 912, 914, 916 specify upper left X and Y positions as well as lower right X and Y positions for the mouse hot spot, together with an entry 918 for mouse flags which cause the mouse hot spot to be activated when the proper menu is displayed. In addition to the hot spots described in the foregoing, additional hot spots are provided at the top and bottom of a list display, to allow scrolling, and in the title bar portion of an area, to permit the area window to be moved.

In addition to the foregoing structures, a data structure is also provided for maintaining the currently selected entries from among the various choices. The current data structure block is shown at 950, and includes an entry 952 for the number of areas currently defined by SETUP; an entry 954 for how many image files are defined; entries 956 and 958, respectively, for how many groups and selects have been defined and an entry 960 for allocating a predetermined maximum number of selects. In an exemplary embodiment, the maximum number of selects is allocated in blocks of ten.

Additional entries 962 and 964 are provided for the number of pixels per column and row, respectively, as well as a font entry 966, an area focus entry 968, a group focus entry 970, and a string focus entry 972. Also, a mouse focus entry 974 is provided for specifying the hot spot. Further, OFOCUS and TFOCUS entries 976 and 978 may be provided for specifying select options and select types with keyboard focus. Still further, IFOCUS and JFOCUS entries 980 and 982 are provided for the hotspot entries 908 and 910 from the mouse structure block described above. Finally, a menu entry 984 is specified for identifying the current menu focus, together with entries 986 and 988 for defining area borders and group borders, together with an OFLAGS entry for specifying mouse modes.

The information specifying the current state of the selects is specified in an ACTIVE SELECT structure 1000. Each structure includes a button entry 1002, an STFLAGS, or select common flags, entry 1004, and an ACTIVE entry, which stores the current state of all selects, from which that data may be made available to the SETUP code.

In an exemplary embodiment, an event queue structure 1010 may also be supplied, for recording keyboard strokes and mouse movements in an event queue.

As noted previously, a key feature of the present invention is that the terminal operating system of the present invention is not compatible with a standard PC/AT BIOS or DOS. However, the terminal operating system is required to support certain of these functions to maintain the ability to display application data in a multiuser environment, such as by interfacing to a Citrix client or other supported emulations. Attached as Tables 3A-3C is a list of the standard IO.SYS and BIOS.SYS functions which are supported by the present invention; it will be apparent to those skilled in the art that the list does not include numerous standard BIOS and DOS functions. Other functions are unsupported. In addition, some of the features which are listed are only partly supported in a presently preferred embodiment. Thus, Function 36h [Get Disk Free Space] is only partly supported due to the use of flash memory instead of a hard disk. Likewise, Function 33h [Get/Set System Value] is supported in terms of function and flag, but the "Control-Break" function is not supported. Similarly, Function 2Ah through 2Dh [Get/Set Date/Time functions] is only partially supported because no real time hardware is provided in the terminal of the present invention. The "Get Time" function is supported so that it may be used to measure the duration of events, without reflecting absolute time.

In addition, the flash file system of the present invention is, in the presently preferred arrangement, partitioned into multiple single-directory drives. However, unlike conventional disk files, the flash file system includes no clusters or sectors. Files within each drive or partition grow upwards from the bottom of the partition, while directory entries grow downward from the top. Files are stored contiguously, without fragmenting. Directory entries, which are sixteen bytes long in a preferred embodiment, are generally similar to a DOS directory entry; however, elements that would normally be reserved are defined to permit the file to execute out of flash, rather than DRAM. These include the starting address of the file within the flash, as well as the remap segment of the file within the DOS address space.

File deletion, while also similar to deletion of conventional DOS files, also differs in some important details. When a file is deleted in the present invention, the first byte of the directory entry is changed to 0, as opposed to setting it to E5h. This step is performed without erasing a flash block. Subsequent files will then be written to the next available space. However, if there is not enough available space for the subsequent files, the flash block for the deleted file is erased and undeleted files are rewritten to the flash block where the deleted file had been maintained. As noted before, file fragmentation is not permitted in at least some embodiments.

The flash file system supports conventional DIR, TYPE and DEL commands, supports a new "DEBUGMSG" command for generating a DEBUG message, and also supports program execution through batch files. The file system also supports the AUTOEXEC.BAT file, as well as loading and executing of .EXE and .COM files, and Int 21h and Int 27h. However, the file system does not support, in at least some embodiments, the CONFIG.SYS file or .SYS device drivers. Likewise, the file system does not support batch file commands (except program execution), I/O redirection, pipes, or interrupts 20h [Program Terminate], 22h [Terminate Address], 23h [Ctrl-Break Exit Address], 24h [Critical Error Handler Vector], 25h [Absolute Disk Read], 26h [Absolute Disk Write], and 2Fh [Muldtiplex Interrupt].

From the foregoing, it will be apparent that, while a selected group of the standard BIOS and DOS functions are emulated or otherwise supported by the terminal operating system of the present invention, a very significant number of standard BIOS and DOS functions are not supported. In addition, even those BIOS and DOS functions that are supported are not executed by standard AT-compatible hardware. Instead, the portion of the terminal operating system referred to in FIG. 4 as the "boot block" 300 and the "kernel" 305 establishes the ability to emulate these functions.

IV. Multisessions

The present invention includes a multisession capability for graphic applications that provides multiple full screen DOS sessions so that a user can switch between emulations such as to provide one window in a Citrix connection and a telnet connection in another window. Generally, the environment is as DOS compatible as possible to simplify porting. The problem with graphic applications is that they require a large amount of memory to hold the graphic screens and that the graphic screens would have to be stored when switching to another screen. The present invention overcomes this problem by sending a signal from the operating system to the application to stop drawing and then redraw the screen, which is switched out of, and switched into the foreground. This is a departure from making the environment completely DOS compatible because it requires some modification of the DOS application. For the ICA emulation, the kernel sends a signal to the Citrix application to redraw the graphics screen. By contrast, the text mode applications under the present invention run without modification because they do not require as much memory and are left unaffected by the signaling.

The Citrix software is an application program that has a DOS version and a WINDOWS version to run on the client. The WINDOWS version requires more hardware resources such as memory to run properly on the client. The Citrix client software runs on the RAM of the terminal. Typically, the client Software connects to an NT or Citrix server where another application is running that the user wants to connect. For example, a spreadsheet program running on the server has display output that comes to the terminal. The emulations run on the RAM of the terminal with various device drivers and diagnostic programs and the kernel and a connection manager of the present invention.

The prior art mechanism for redrawing a screen involves Citrix client software sending a "stop" command to the server to stop sending output and then sends a redisplay command to send data to redraw the screen. Specifically, the Citrix software uses a connection manager to invoke the stop request to send the open session to the background when the connection manager is opened. The Citrix software does not allow establishing multiple connections. Only one session can be open at a time. Furthermore, only one of an open session or the connection manager can be open in the foreground at a time.

The present invention allows opening multiple sessions with each session having its own virtual machine that it runs in. The stop request and redisplay commands are taken advantage of so that when a session is moved to the background, it will not be trying to draw it on the screen. The screen is not saved in memory.

The present invention gives each virtual machine its own text mode buffer, so when it is in the background it has a virtual buffer that it can write to and it continues to run in the background. For instance, if the screen is being drawn to in the text mode (writing characters to the screen) when the screen is switched to the background, the mapping of the data will continue to the virtual buffer rather than to the actual physical hardware while the screen is in the background. The kernel handles the mapping transparently to the application.

For graphics applications, the present invention sends a signal to the application. The application sends a signal out to the host to command it to stop sending display. When the application screen is switched back to the foreground, the host is commanded to redisplay the screen. The amount of network traffic caused by the application being in the background is drastically reduced compared to the prior art. By contrast, the Citrix software continues to receive data to an application in the background session. The data, however, is not displayed. The sending and receiving of data from the server to the background application results in continuous network traffic and a drain on other system resources like memory and CPU utilization.

The present invention is particularly suitable to a DOS environment where the hardware resources are limited and cannot support a complete WINDOWS operating system on the terminal. The present invention provides a terminal that can run multiple connections with multiple graphic sessions of WINDOWS applications. Preferably, the multiple graphic sessions are run in a DOS environment.

V. System Kernel and System Configuration

Appendix "A" lists various services provided by the Windows system kernel, where these services are accessed through various interrupts.

FIGS. 8-12 illustrate various configuration parameters for a terminal according to the invention.

FIG. 8 shows a memory address map for the terminal system including address ranges, memory sizes, bus widths, and descriptions for the DRAM, the base memory, the VGA display memory, the boot block shadow, the VGA linear address, the peripherals, the network memory space, ROMCS2 (Flash Bank 2), ROM/FLASH Bank 1, ROM/FLASH Bank 0, and Boot ROM/FLASH.

FIG. 9 shows an I/O address map, which includes address ranges, sizes, and descriptions for various I/O items.

FIG. 10 shows interrupt assignments for various hardware and SC400 internal interrupts.

FIG. 11 shows various DMA channel assignments.

FIG. 12 shows chip select for various devices along with address ranges.

VI. Software Description

The present invention expands the functionality of the previous Multi User NT to provide enhanced remote administration functions using industry standard protocols. These enhanced remote administration functions perform software image upgrades, modify terminal user-interface selections, and improve terminal status reporting.

Network Driver Loading

This version of software will attempt to load Ethernet drivers at bootup as the default network drivers. Normally, the network drivers load with very few messages in a single message box. If there is an error, the error message appears briefly, then goes away, and the terminal automatically continues. The network driver cannot continue to load if there was an error, but the connection manager can come up. If a verbose method is enabled more detailed messages are scrolled in the network box while the network is loading, and any errors that cause the network driver to fail loading will require the user to press a key acknowledging the error, before the terminal continues with its boot process.

FTP Enhancement

This version of inventive software supports the File Transfer Protocol (FTP), which is used exclusively for firmware images upgrades and remote terminal configurations. Use of TFTP is also suitable.

DHCP Automated Software Image Upgrades

The present invention uses the Dynamic Host Configuration Protocol DHCP and FTP to provide automated downloading of a new image via the network. For this process to work, the inventive software uses DHCP instead of a static IP address and having the DHCP Update field enabled.

The new update process functions such that on boot, the inventive software downloads new custom DHCP Options as follows: a) Tag 161 (IP octet or IP string up to twenty characters) indicates the FTP server on which the image software and control files (PARAMS.INI AND PARAM#.INI) are found. b) Tag 162 (String up to eighty characters) indicates the FTP server's root directory path on the server which image software and control file (params.ini and param#.ini) are found. c) Tag 163 (IP Array, maximum of four entries) contains a list of IP numbers for SNMP Trap Servers where the local IP Trap Server entries in the inventive software's user interface override though it is configured through DHCP. Tag 163 contains a list of IP numbers for the SNMP Trap Servers. If the corresponding SNMP Trap server entries in the local user interface are filled in, the local entries will override the values obtained through DHCP Tag 163. d) Tag 164 (String up to sixty characters) indicates the SNMP Set Community where the local Set Community entry in the inventive software's user interface overrides though it is configured through DHCP.

After a DHCP command has been performed, the inventive software uses information in the local copy of the PARAMS.INI (for base software) and PARAM#.INI (for option software packages) files to determine the path from the FTP base directory where the terminal specific files (including control, base image files and option image files) are retained. The configuration file entries are listed in Table 2.

A matrix of how this path is structured is as follows:

```
<<<Entire FTP TREE>>>
\\Server from DHCP Tag 161
  \root directory from DHCP Tag 162 (root$ terminates tree creation.
  See note
    \Option from Option= entry in PARAMS.INI or PARAM#.INI
      \\-OemName from OemName= entry in PARAMS.INI or
      PARAM#.INI
        \Os from Os= entry in PARAMS.INI or PARAM#.INI
          \\-Platform from Platform= entry in PARAMS.INI or
          PARAM#.INI
            \\-Refresh from Refresh= entry in PARAMS.INI
            orPARAM#.INI
              \UserPath from UserPath= entry in PARAMS.INI
              or PARAM#.INI
                -PARAMS.INI or PARAM#.INI file
                -Base or Option Image file
```

Note that if a string sent with Tag 162 or DHCP_OPT_ADM_FILEROOTPATH ends with a "$", this is considered the complete path to the PARAMS.INI, PARAM#.INI and image files. This indicator bypasses the imposed Wyse FTP Tree structure illustrated above.

Note that blank levels are skipped. For example, if this is standard Wyse base software (from defaults), the Option subdirectory, the OemName subdirectory and the UserPath subdirectory portions of the tree will not exist in the path. The remaining structure would be \\Server\root directory\os\platform\refresh\file.

1. After the correct path has been determined, the inventive software will connect via FTP to the specified \\server\path and download all PARAMS.INI and PARAM#.INI files. The inventive software will then compare the build number information and modification data information (BuildVer=, Oem- BuildVer=, and ModDate=information strings) of the PARAMS.INI and/or PARAM#.INI FTP server files with the local files on the server to determine if an upgrade is required. If all strings match, the terminal. will complete the boot into the user interface and function normally. If any string does not match, the inventive software will continue the upgrade process as follows:

2. The inventive software will download the appropriate bundled Winterm base or option image indicated by the server PARAMS.INI or PARAM#.INI into RAM. During the network transfer of an image, if the network download is interrupted due to a loss of the network connection or power to the unit, the inventive software will not be adversely affected. Note that the maximum image size that can be transferred must be less than the amount of RAM available at the start of the transfer. If there is insufficient RAM available at the transfer start, then the image is unbundled on the fly and saves to the FLASH to upgrade the image.

3. After the entire image is downloaded to RAM, the inventive software will unbundle the image and update the Boot Block and NAND Flash. This is similar to the update performed when downloading an image to the inventive software through a Parallel, Serial, or Flash Card update. The boot block will be checked first, and if the boot block code has changed a new boot block will be downloaded. The main image then will be written to the NAND flash. If power is interrupted during the file transfer to the boot block (this period is extremely small since the component is only 256K bytes in size), the boot block may be corrupted requiring a new pre-programmed component to be installed. If power is interrupted during a file transfer to the NAND flash (this time period too is small and takes only a few seconds to complete the upgrade), the NAND flash main image code may be corrupted requiring a serial, parallel, or flash card update.

4. Once the image update has been completed, the inventive software will automatically reboot. Note: During the DHCP update process, the inventive software sends SNMP Traps to reflect the current status of the terminal download process. DHCP related Traps are described below.

SNMP Enhancements

In the inventive software, the Simple Network Management Protocol SNMP enhancements listed in TABLE 1 are incorporated. Appendix B is hereby incorporated by reference and lists the portion of the Management Information Base for the network connections, user definitions and traps described herein.

1) Wyse Enterprise Specific Management Information Base MIB database —Memory Configuration Reporting for RAM and ROM Configuration Reporting 2) PCMCIA Device Reporting for Reporting on Inserted PCMCIA Devices 3) IO Device Reporting 4) Display Reporting reports the current and maximum values for display characteristics.

5) DHCP Information Reporting reports the values received from the DHCP server for the custom option values.

6) ROM Image Information Reporting reports the values associated with the ROM images actually loaded on the Winterm and those for the images loaded on the FTP server designated in wbt3FileServer.

7) Custom field content reporting. The contents of the three custom fields that can be configured through the Winterm UI on the SNMP/Network Administration property sheet.

8) The MIB also provides remote administration related functions. The fields within this group are writable so that an upload or download process can be initiated by setting proper values in these fields for File Uploading and Downloading.

Note that upload and download requests generated by the SNMP manager prior the Winterm generating the sbt2TrapSNMPAccptLd trap will be ignored. Destination hosts, which will receive these traps, can be defined in the inventive software user interface.

9) SNMP Traps —The following SNMP traps are supported: a) Warmstart b) Coldstart c) Linkup d) Authentication Failure e) Equipment Specific TRAPS for Automated and Interactive Image Updates.

SNMP Interactive and Automated Software Image Upgrade

In this version of the inventive software, support is added through SNMP and FTP to cause an interactive or automated downloading of a new image via the network. This update process generally functions as follows:

SNMP updates must be enabled and "SNMP updates enabled" are the default settings on this version of software.

1. The Winterm powers up and sends the wbt3TrapSNMPAccptLd Trap when the terminal is ready to receive a file upload or download request through SNMP.

2. For automated downloading, through OpenView or other SNMP management programs the administration program will be able to detect the wbt3TrapSNMPAccptLd Trap and through scripting identify the current revision of software and initiate file uploads or downloads to the inventive software.

3. Through SNMP, the current Winterm configuration can be obtained via a FTP/TFTP connection by requesting the setting REG file. These files can then be modified and then downloaded to the inventive software terminal. Similarly, an entire binary image can be downloaded to the inventive software terminal.

If the inventive software has a connected session, an image upgrade process will display a message and prompt acceptance. After a file download is completed, the terminal will automatically reboot. The process of uploading files from the terminal transparently occurs in the background.

4. Bundled image updates will be handled identically as in DHCP image updates with the exceptions that: the FPT/TFTP server, path and filenames to be downloaded are specified via setting appropriate objects in the wbt3UpDnLoad group and download is not conditional on the contents of a PARAM#.INI file. Any download requested through the SNMP interface will be attempted unconditionally.

5. Once the image update has been completed, the inventive software will automatically reboot.

The present invention uses SNMP to remotely configure the terminal on a thin-client network. Typical configuration settings that can be remotely administered include, but are not limited to, the network interface, display, keyboard, any peripheral, any terminal emulation characteristics, security features, user account information, etc. This configuration data differs from information data which includes information about the RAM and FLASH memory, other hardware information, PC card slots, what PC card is plugged in, what peripherals are attached, the maximum resolution supported for display, what frequency is supported for the display, what information DHCP obtained, etc.

The MIB of the present invention is used to remotely configure a thin-client terminal even though the MIB resides on the server for the network. Other protocols can be used.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A terminal for communicating with a server, the terminal comprising:
a network interface for communicating with a server; and
a processor coupled to the network interface, the processor for operating with the network interface, the processor for accessing a windows application resident on the server without executing locally the windows application resident on the server.

2. A terminal according to claim 1 further comprising:
a display coupled to the processor, the display for displaying windowing information from the windows application; and
an input device coupled to the processor, the input device for receiving an input from a user,
wherein the terminal includes no hard disk.

3. A terminal according to claim 1, wherein the terminal is a thin-client device.

4. A terminal according to claim 1, wherein the terminal is secure.

5. A terminal according to claim 1, further comprising:
a flash memory configured to store an operating system that is updated through communication with the server when the terminal is placed in a predetermined state.

6. A terminal according to claim 5, wherein the flash memory has a flash file system that is partitioned into multiple single-directory drives having no clusters or sectors, wherein the flash memory permits a file to be executed out of the flash memory.

7. A terminal for communicating with a server, the terminal comprising:
a network interface for communicating with a server; and
a processor coupled to the network interface, the processor for operating with the network interface, the processor for providing windowing functionality to permit use of a windows application resident on the server without requiring more than windowing information of the windows application to be transmitted from the server, the windowing information including application data.

8. A terminal according to claim 7 further comprising:
a display coupled to the processor, the display for displaying information from the windows application; and
an input device for receiving an input from a user,
wherein the terminal is a thin-client device.

9. A terminal according to claim 7, further comprising:
a flash memory configured to store an operating system that is updated through communication with the server when the terminal is placed in a predetermined state.

10. A terminal according to claim 9, wherein the flash memory has a flash file system that is partitioned into multiple single-directory drives having no clusters or sectors, wherein the flash memory permits a file to be executed out of the flash memory.

11. A terminal for communicating with a server, the terminal comprising:
a processor for receiving windowing information supplied by a program executing on a server, the server for running a multi-user operating system, the program resident on the server; and
one or more memories coupled to the processor, a total amount of the one or more memories less than a total amount of one or more memories in the server.

12. A terminal according to claim 11 further comprising:
a display coupled to the processor, the display for displaying windowing information from the program executing on the server,
wherein the terminal is a thin-client device, and the server is a remotely located server.

13. A terminal according to claim 11, wherein the one or more memories comprises:
a flash memory configured to store an operating system that is updated through communication with the server when the terminal is placed in a predetermined state.

14. A terminal according to claim 13, wherein the flash memory has a flash file system that is partitioned into multiple single-directory drives having no clusters or sectors, wherein the flash memory permits a file to be executed out of the flash memory.

15. A terminal for communicating with a server, the terminal comprising:
a network interface for communicating with a server;
a processor coupled to the network interface, the processor for operating with the network interface, the processor for providing windowing functionality to permit use of a windows application resident on the server,
wherein the terminal does not include a hard disk,
wherein the terminal is for providing an appearance that is essentially the same as an appearance provided by a personal computer.

16. A terminal according to claim 15 further comprising:
a display coupled to the processor, the display for displaying information from the windows application resident on the server and for displaying the appearance that is essentially the same as the appearance provided by the personal computer;
wherein the terminal is a thin-client device.

17. A terminal according to claim 15, wherein the terminal is for providing one or more features associated with a multi-user system and for providing one or more features associated with a client-server environment.

18. A terminal according to claim 15, further comprising:
a flash memory configured to store an operating system that is updated through communication with the server when the terminal is placed in a predetermined state.

19. A terminal according to claim 18, wherein the flash memory has a flash file system that is partitioned into multiple single-directory drives having no clusters or sectors, wherein the flash memory permits a file to be executed out of the flash memory.

20. A machine-readable storage medium comprising:
software code for communicating between a terminal and a server, the software code for performing the steps of:
operating with a network interface;
accessing a windows application resident on the server without executing locally at the terminal the windows application resident on the server; and
providing windowing information to a display.

21. A machine-readable storage medium according to claim 20, wherein the terminal is a thin-client device, and the machine-readable medium is included in one or more devices.

22. A machine-readable storage medium comprising:
software code for communicating between a terminal and a server, the software code for performing the steps of:
operating with a network interface;

providing windowing functionality to permit use of a windows application resident on the server without requiring more than windowing information of the windows application to be transmitted from the server to the terminal, the windowing information including application data; and providing windowing information to a display.

23. A machine-readable storage medium according to claim 22, wherein the machine-readable medium is included in one or more devices.

24. A machine-readable storage medium comprising:

software code for communicating between a terminal and a server, the terminal having one or more memories, a total amount of the one or more memories less than a total amount of one or more memories in the server, the software code for performing the steps of:

operating with a network interface;

receiving windowing information supplied by a program executing on the server, the server for running a multi-user operating system, the program resident on the server; and providing windowing information to a display.

25. A machine-readable storage medium according to claim 24, wherein the machine-readable medium is included in one or more devices.

26. A machine-readable storage medium comprising:

software code for communicating between a terminal and a server, the terminal having no hard disk, the software code for performing the steps of:

operating with a network interface;

providing at the terminal windowing functionality to permit use of a windows application resident on the server; and providing at the terminal an appearance that is essentially the same as an appearance provided at a personal computer.

27. A machine-readable storage medium according to claim 26, wherein the machine-readable medium is included in one or more devices.

28. A machine-readable medium storage according to claim 26, wherein the terminal is a thin-client device.

* * * * *

UNITED STATES PATENT AND TRADEMARK OFFICE
CERTIFICATE OF CORRECTION

| | |
|---|---|
| PATENT NO. | : 8,079,021 B2 |
| APPLICATION NO. | : 11/406359 |
| DATED | : December 13, 2011 |
| INVENTOR(S) | : Randy Buswell et al. |

Page 1 of 1

It is certified that error appears in the above-identified patent and that said Letters Patent is hereby corrected as shown below:

IN THE SPECIFICATION:

Column 20, Line 38:   Replace "FPT/TFTP", with -- FTP/TFTP --

Signed and Sealed this
Fifth Day of June, 2012

David J. Kappos
*Director of the United States Patent and Trademark Office*